(12) United States Patent  (10) Patent No.: US 8,045,078 B2
Lim et al.  (45) Date of Patent: Oct. 25, 2011

(54) ARRAY SUBSTRATE FOR LIQUID CRYSTAL DISPLAY DEVICE AND METHOD OF FABRICATING THE SAME

(75) Inventors: Joo-Soo Lim, Gyeongsangbuk-do (KR); Hwan Kim, Daegu (KR); Hyo-Uk Kim, Gyeongbuk-do (KR); Byoung-Ho Lim, Gyeongsangbuk-do (KR)

(73) Assignee: LG Display Co., Ltd., Seoul (KR)

( * ) Notice: Subject to any disclaimer, the term of this patent is extended or adjusted under 35 U.S.C. 154(b) by 705 days.

(21) Appl. No.: 12/003,715

(22) Filed: Dec. 31, 2007

(65) Prior Publication Data

US 2009/0032819 A1  Feb. 5, 2009

(30) Foreign Application Priority Data

Jul. 20, 2007 (KR) .................. 10-2007-0073047

(51) Int. Cl.
*G02F 1/136* (2006.01)
(52) U.S. Cl. ............... 349/43; 349/42; 349/141; 438/30
(58) Field of Classification Search .................. None
See application file for complete search history.

(56) References Cited

U.S. PATENT DOCUMENTS

| 5,828,082 | A | 10/1998 | Wu |
| 7,705,947 | B2* | 4/2010 | Ahn et al. ............ 349/141 |
| 7,719,622 | B2* | 5/2010 | Lim ...................... 349/38 |
| 7,751,011 | B2* | 7/2010 | Ahn et al. ............ 349/141 |
| 2001/0040662 | A1 | 11/2001 | Cheng |
| 2003/0008436 | A1 | 1/2003 | Tanaka et al. |
| 2004/0041958 | A1 | 3/2004 | Hwang et al. |
| 2005/0083466 | A1* | 4/2005 | Lee et al. ............ 349/141 |
| 2005/0162579 | A1* | 7/2005 | Jeong et al. ......... 349/43 |
| 2006/0139504 | A1* | 6/2006 | Ahn et al. ............ 349/42 |
| 2008/0174711 | A1* | 7/2008 | Jung et al. ........... 349/46 |
| 2010/0165281 | A1* | 7/2010 | Ahn et al. ........... 349/141 |

FOREIGN PATENT DOCUMENTS

| CN | 1375733 A | 10/2002 |
| CN | 1614492 A | 5/2005 |
| CN | 1794076 A | 6/2006 |
| CN | 1794078 A | 6/2006 |
| CN | 1992236 A | 7/2007 |
| DE | 10 2005 058 680 A1 | 7/2006 |

(Continued)

OTHER PUBLICATIONS

Office Action issued Jan. 8, 2010 in corresponding Chinese Application No. 200710300840.X.

*Primary Examiner* — Thanh-Nhan Nguyen
(74) *Attorney, Agent, or Firm* — Morgan, Lewis & Bockius LLP

(57) ABSTRACT

An array substrate for a liquid crystal display device, including: a substrate; a gate line on the substrate; a data line crossing the gate line to define a pixel region; a thin film transistor connected to the gate line and the data line, the thin film transistor including a gate electrode connected to the gate line, a semiconductor layer whose boundary is within the gate electrode, a source electrode connected to the data line and a drain electrode spaced apart from the source electrode; a passivation pattern covering the data line and the thin film transistor; and a pixel electrode extending from the drain electrode.

9 Claims, 35 Drawing Sheets

FOREIGN PATENT DOCUMENTS

| | | |
|---|---|---|
| DE | 10 2004 015 276 B4 | 7/2007 |
| DE | 10 2007 027 645 A1 | 1/2008 |
| DE | 10 2007 029 421 A1 | 1/2008 |
| DE | 10 2006 029 909 A1 | 5/2009 |
| EP | 1 804 290 | 7/2006 |
| JP | 59217331 A * | 12/1984 |
| JP | 06-160847 | 6/1994 |
| JP | 06-208131 | 7/1994 |
| JP | 08-076144 | 3/1996 |
| JP | 09-139503 | 5/1997 |
| JP | 11-040814 | 2/1999 |
| JP | 2000-180898 A | 6/2000 |
| JP | 2001-242490 | 9/2001 |
| JP | 2007-094433 | 4/2007 |
| KR | 1020020057032 A | 7/2002 |
| KR | 1020050038051 A | 4/2005 |
| KR | 1020050055384 A | 6/2005 |

* cited by examiner

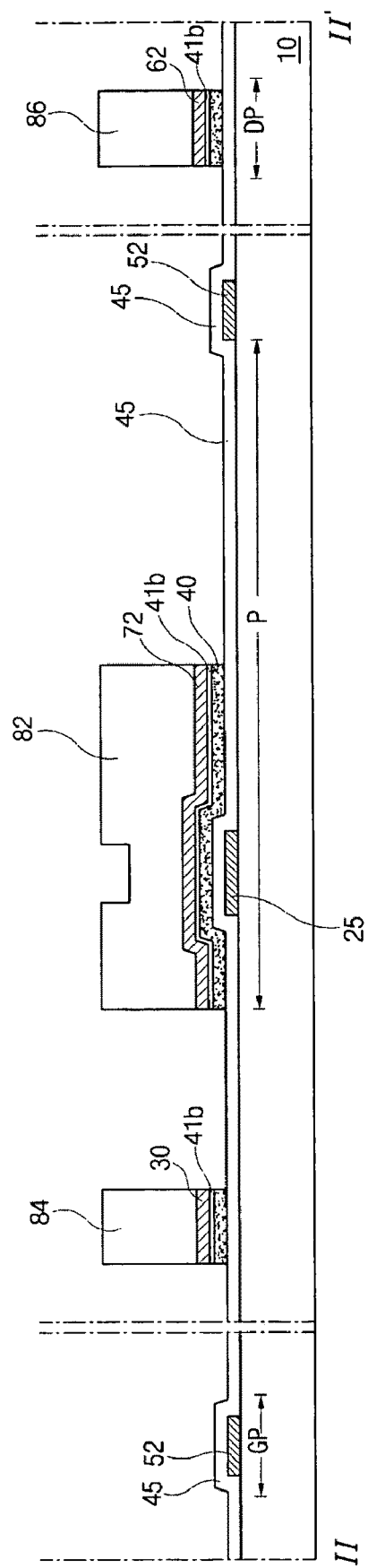
(related art) FIG. 2E

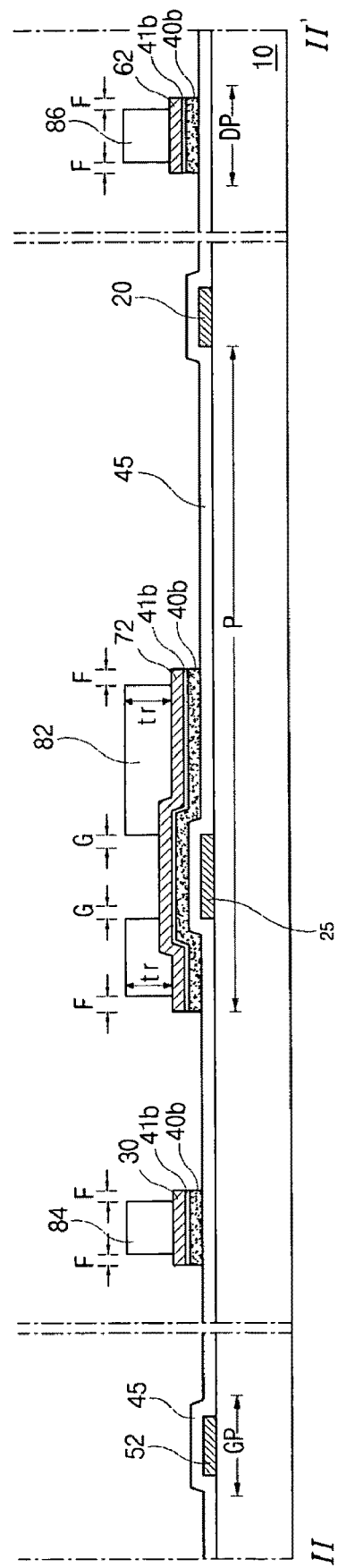
(related art) FIG. 2F

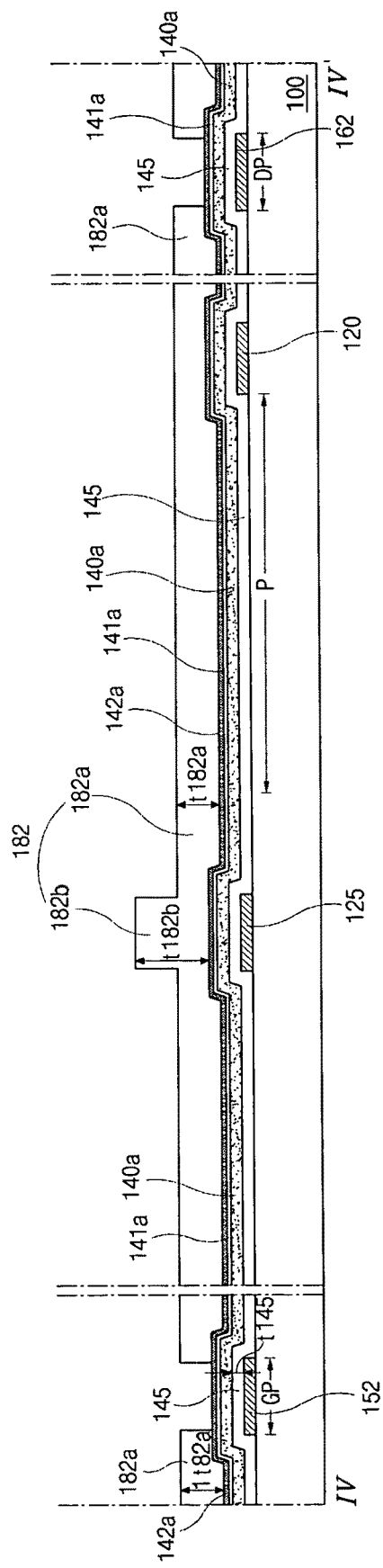

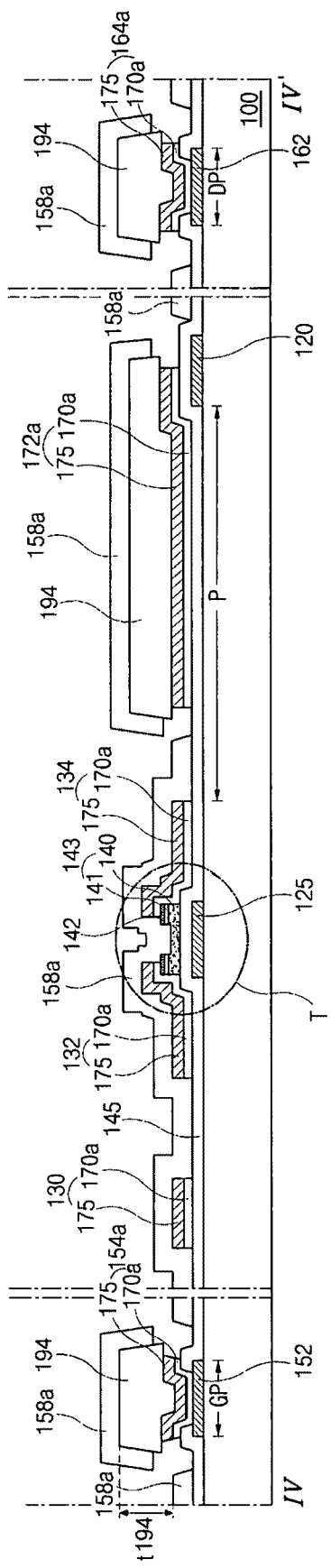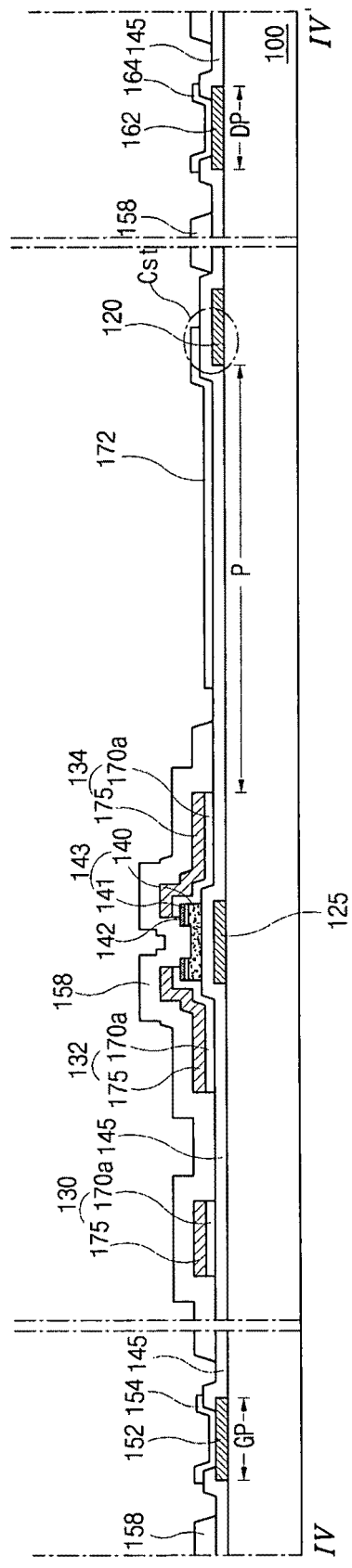

US 8,045,078 B2

ARRAY SUBSTRATE FOR LIQUID CRYSTAL DISPLAY DEVICE AND METHOD OF FABRICATING THE SAME

This invention claims the benefit of Korean Patent Application No. 2007-0073047, filed on Jul. 20, 2007, which is hereby incorporated by reference in its entirety.

BACKGROUND OF THE INVENTION

1. Field of the Invention

Embodiments of the invention relate to a liquid crystal display (LCD) device and a method of fabricating the liquid crystal display device, and more particularly, to an array substrate for a liquid crystal display device having a passivation pattern and a method of fabricating the array substrate through a three-mask process.

2. Discussion of the Related Art

Liquid crystal display (LCD) devices use the optical anisotropy and polarization properties of liquid crystal molecules to produce an image. The liquid crystal molecules have long, thin, shapes, and have an initial alignment direction, including initial pretilt angles. The alignment direction can be controlled by applying an electric field. Due to an optical anisotropy property of liquid crystal, the refraction of incident light depends on the alignment direction of the liquid crystal molecules. Thus, by properly controlling the applied electric field, an image having a desired brightness can be produced.

Among the known types of liquid crystal displays (LCDs), active matrix LCDs (AM-LCDs), which have thin film transistors (TFTs) and pixel electrodes arranged in a matrix form, are the subject of significant research and development because of their high resolution and superior ability in displaying moving images. An array substrate for a liquid crystal display (LCD) device may be fabricate through a four-mask process and the fabrication method will be illustrated hereinafter.

FIG. 1 is a schematic top view showing an array substrate for a liquid crystal display device according to the related art. In FIG. 1, a gate line 20, a gate electrode 25 and a gate pad 52 are formed on a substrate 10. The gate electrode 25 extends from the gate line 20 and the gate pad 52 is formed at one end of the gate line 20. Further, a data line 30, a source electrode 32, a drain electrode 34 and a data pad 62 are formed on the substrate 10. The data line 30 crosses the gate line 20 to define a pixel region P. The source electrode 32 extends from the data line 30 and the drain electrode 34 is spaced apart from the source electrode 32. The data pad 62 is formed at one end of the data line 30. A gate pad terminal 54 on the gate pad 52 is connected to the gate pad 52 through a gate pad contact hole CH2, and a data pad terminal 64 on the data pad 62 is connected to the data pad 62 through a data pad contact hole CH3.

FIGS. 2A to 2I are schematic cross-sectional views taken along the line II-II' of FIG. 1, showing a fabricating method of an array substrate for a liquid crystal display device using a four-mask process according to the related art.

A thin film transistor (TFT) T is connected to the gate line 20 and the data line 30. The TFT T includes the gate electrode 25, a semiconductor layer 42 (of FIG. 2I), the source electrode 32 and the drain electrode 34. The semiconductor layer 42 is formed over the gate electrode 25, and the source and drain electrodes 32 and 34 contact the semiconductor layer 42. The semiconductor layer 42 includes an active layer 40 of intrinsic amorphous silicon (a-Si:H) and an ohmic contact layer 41 (of FIG. 2I) of an impurity-doped amorphous silicon (n+ a-Si:H). In addition, the semiconductor layer 42 has the same shape as and is formed under the data line 30, the data pad 62, the source electrode 32 and the drain electrode 34. Specifically, the active layer 40 is exposed out of the data line 30, the source electrode 32 and the drain electrode 34. Moreover, the active layer 40 is exposed between the source electrode 32 and the drain electrode 34 by partially removing an ohmic contact pattern 41b (of FIG. 2F) to define a channel region ch (of FIG. 2G) for current flow.

A pixel electrode 70 is formed in the pixel region P and connected to the drain electrode 34 through a drain contact hole CH1. The pixel electrode 70 overlaps the gate line 20 corresponding to a neighboring pixel region to define a storage capacitor Cst including an overlapped portion of the gate line 20 as a first capacitor electrode and an overlapped portion of the pixel electrode 70 as a second capacitor electrode.

FIG. 2A shows a first mask process, a gate line 20, a gate electrode 25 and a gate pad 52 are formed on a substrate 10 having a pixel region P by depositing and patterning a conductive metallic material such as copper (Cu), molybdenum (Mo), aluminum (Al), aluminum (Al) alloy or chromium (Cr). Although not shown in FIG. 2A, the gate electrode 25 extends from the gate line 20 and the gate pad 52 is formed at one end of the gate line 20. A gate insulating layer 45 is formed on the gate line 20, the gate electrode 25 and the gate pad 52. The gate insulating layer 45 includes an inorganic insulating material such as silicon nitride ($SiN_x$) and silicon oxide ($SiO_2$).

FIGS. 2B to 2G show a second mask process. In FIG. 2B, an intrinsic silicon layer 40a and a doped silicon layer 41a are sequentially formed on the gate insulating layer 45. The intrinsic silicon layer 40a includes intrinsic amorphous silicon (a-Si:H) and the doped silicon layer 41a includes impurity-doped amorphous silicon layer (n+ a-Si:H). For example, the intrinsic silicon layer 40a and the doped silicon layer 41a may be sequentially formed in the chamber where the gate insulating layer 45 is formed using a chemical vapor deposition (CVD) method. Next, a source drain metal layer 75 is formed on the doped silicon layer 41a. The source drain metal layer 75 includes a conductive metallic material such as copper (Cu), molybdenum (Mo), aluminum (Al), aluminum (Al) alloy or chromium (Cr).

In FIG. 2C, a photoresist (PR) layer 80 is formed on the source drain metal layer 75 and a mask HTM is disposed over the PR layer 80. The mask HTM has a transmissive area A, a half-transmissive area B and a blocking area C. Transmittance of the half-transmissive area B is smaller than transmittance of the transmissive area A and greater than transmittance of the blocking area C. The transmittance of the half-transmissive area B is obtained by forming a half-transmissive film or forming a slit pattern. Accordingly, when the PR layer is exposed to light through the mask HTM, the PR layer 80 corresponding to the half-transmissive area B is incompletely exposed. In addition, the PR layer corresponding to the transmissive area A is completely exposed and the PR layer corresponding to the blocking area C is not exposed. The blocking area C is disposed to correspond to a data line 30 (of FIG. 2E), a data pad 62, a source electrode 32 (of FIG. 2G) and a drain electrode 34 (of FIG. 2G) formed in a subsequent process, and the half-transmissive area B is disposed to correspond to a channel region ch (of FIG. 2G) between the source and drain electrodes 32 and 34 formed in a subsequent process.

FIG. 2D shows first, second and third PR patterns 82, 84 and 86 formed on the source drain metal layer 75 by exposing and developing the PR layer 80. The first PR pattern 82 has a first portion 82a corresponding to the half-transmissive area B (of FIG. 2C) and second 82b portions corresponding to the blocking area C (of FIG. 2C). Accordingly, the first portion 82a between the second 82b portions has a first thickness t82a smaller than the second thickness t82b of the second portions 82b. Further, since the second and third PR patterns 84 and 86 correspond to the blocking area C (of FIG. 2C), the second and third PR patterns 84 and 86 have the second thickness t82b. The second and third PR patterns 84 and 86 correspond to the data line 30 (of FIG. 2E) and the data pad 62 (of FIG. 2C), respectively. The PR layer 80 (of FIG. 2C) corresponding to the transmissive area A (of FIG. 2C) is completely removed to expose the source drain metal layer 75 (of FIG. 2D).

In FIG. 2E, the source drain metal layer 75 (of FIG. 2D) is patterned by using the first, second and third PR patterns 82, 84 and 86 as an etching mask to form a source drain metal pattern 72, the data line 30 and the data pad 62. The source drain metal pattern 72, the data line 30 and the data pad 62 correspond to the first, second and third PR patterns 82, 84 and 86, respectively. Further, the source drain metal layer 75 (of FIG. 2D) corresponding to the transmissive area A (of FIG. 2C) is completely removed to expose the doped silicon layer 41a. Although not shown in FIG. 2E, the source drain metal pattern 72 is electrically connected to the data line 30.

The doped silicon layer 41a (of FIG. 2D) and the intrinsic silicon layer 40a (of FIG. 2D) are patterned by using the first, second and third PR patterns 82, 84 and 86 as an etching mask to form an active layer 40 and an ohmic contact pattern 41b. As a result, the active layer 40 and the ohmic contact pattern 41b have the same shape as and are formed under the source drain metal pattern 72, the data line 30 and the data pad 62. Although the active layer 40 and the ohmic contact pattern 41b are required to have an island shape only under the source drain metal pattern 72, the active layer 40 and the ohmic contact pattern 41b are formed under the data line 30 and the data pad 62 as well as the source drain metal pattern 72. The active layer 40 and the ohmic contact pattern 41b under the data line 30 and the data pad 62 also extend from the active layer 40 and the ohmic contact pattern 41b under the source drain metal pattern 72 because the source drain metal layer 72, the doped silicon layer 41a and the intrinsic silicon layer 40a are patterned altogether.

In FIG. 2F, the first, second and third PR patterns 82, 84 and 86 have been partially removed by an ashing. As a result, the first portion 82a (FIG. 2E) of the first PR pattern 82 having the first thickness t82a is completely removed to expose the source drain metal pattern 72. In addition, the second portions 82b (FIG. 2E) of the first PR pattern 82, the second PR pattern 84 and the third PR pattern 86 having the second thickness t82b are partially removed to have a reduced thickness tr smaller than the second thickness. Since the ashing is an isotropic process, side portions of the first, second and third PR patterns 82, 84 and 86 are also removed to expose first edge portions F at outer edges of the source drain metal pattern 72, the data line 30 and the data pad 62. Further, second edge portions G (of FIG. 2E) inside the source drain metal pattern 72 are also exposed.

In FIG. 2G, the source drain metal pattern 72 and the ohmic contact pattern 41b have been patterned by using the partially removed first, second and third PR patterns 82. 84 and 86 to form a source electrode 32, a drain electrode 34 and an ohmic contact layer 41. The active layer 40 and the ohmic contact layer 41 are defined as a semiconductor layer 42, and the gate electrode 25, the semiconductor layer 42, the source electrode 32 and the drain electrode 34 define a thin film transistor (TFT) T. The active layer 40 exposed between the source and drain electrodes 32 and 34 is used as a channel region ch. Since the ohmic contact pattern 41b in the first edge portions F is eliminated, the active layer 40 in the first edge portions F is protruded beyond the outer edges of the data line 30, the data pad 62, the source electrode 32 and the drain electrode 34. In addition, since the ohmic contact pattern 41b in the second edge portions G is eliminated, the channel region ch of the active layer 40 has a length greater than a designed value. This may cause deterioration of the TFT T. Next, the first, second and third PR patterns 82, 84 and 86 are removed by a stripping.

FIG. 2H shows a third mask process. In FIG. 2H, a passivation layer 55 is formed on the data line 30 and the TFT T by depositing and patterning one of an inorganic insulating material such as silicon nitride (SiNx) and silicon oxide (SiO$_2$) and an organic insulating material such as benzocyclobutene (BCB) and acrylic resin. The passivation layer 55 has a drain contact hole CH1 exposing the drain electrode 34, a gate pad contact hole CH2 exposing the gate pad 52 and a data pad contact hole CH3 exposing the data pad 62. The gate pad contact hole CH2 is formed in the gate insulating layer 45 and the passivation layer 55, while the drain contact hole CH1 and the data pad contact hole CH3 are formed in the passivation layer 55. Accordingly, the gate pad 52 may be incompletely exposed, or the drain electrode 34 and the data pad 62 may have etch damage due to the length of exposure. The incomplete exposure and the damage may cause deterioration in contact property.

FIG. 2I shows a fourth mask process. In FIG. 2I, a pixel electrode 70, a gate pad terminal 54 and a data pad terminal 64 are formed on the passivation layer 55 by depositing and patterning a transparent conductive material such as indium-tin-oxide (ITO) and indium-zinc-oxide (IZO). The pixel electrode 70 is connected to the drain electrode 34 through the drain contact hole CH1. In addition, the gate pad terminal 54 is connected to the gate pad 52 through the gate pad contact hole CH2 and the data pad terminal 64 is connected to the data pad 62 through the data pad contact hole CH3. The pixel electrode 70 overlaps the gate line 20 corresponding to a neighboring pixel region to define a storage capacitor Cst having overlapped portions of the gate line 20 and the pixel electrode 70 as first and second capacitor electrodes, respectively, and the gate insulating layer 45 and the passivation layer 55 as a dielectric layer.

In the array substrate for an LCD device fabricated through a four-mask process according to the related art, since the data line 30, the source electrode 32, the drain electrode 34 and the semiconductor layer 42 are formed again using the same mask (the second mask), the semiconductor layer 42 is formed under the data line 30, the source electrode 32 and the drain electrode 34. Specifically, since the active layer 40 under the source electrode 32 is connected to the active layer 40 under the data line 30, the active layer 40 of the TFT T is protruded beyond the gate electrode 25. As a result, a photo-current is generated in the protruded portion of the active layer 40 of the TFT T due to exposure to a backlight unit and causes deterioration in the electrical properties of the TFT T.

In addition, the active layer 40 under the data line 30 is protruded beyond the outer edges of the data line 30. The photocurrent may be generated in the protruded portion of the active layer 40 under the data line 30. Further, since the active layer 40 under the data line 30 is closer to the pixel electrode 70 than the data line 30, a coupling capacitance between the active layer 40 under the data line 30 and the pixel electrode 70 is greater than a coupling capacitance between the data line 40 and the pixel electrode 70. The increased coupling capacitance between the active layer 40 under the data line 30 and the pixel electrode 70 causes a wavy noise that ripple patterns are displayed.

SUMMARY OF THE INVENTION

Accordingly, embodiments of the invention are directed to an array substrate for liquid crystal display device and method of fabricating the same that substantially obviates one or more of the problems due to limitations and disadvantages of the related art.

An object of embodiments of the invention is to provide an array substrate for a liquid crystal display (LCD) device having an island shaped semiconductor layer.

Another object of embodiments of the invention is to provide a method of fabricating an array substrate for an LCD device using a three-mask process that prevents warping of various components.

Additional features and advantages of embodiments of the invention will be set forth in the description which follows, and in part will be apparent from the description, or may be learned by practice of embodiments of the invention. The objectives and other advantages of the embodiments of the invention will be realized and attained by the structure particularly pointed out in the written description and claims hereof as well as the appended drawings.

To achieve these and other advantages and in accordance with the purpose of embodiments of the invention, as embodied and broadly described, the array substrate for liquid crystal display device and method of fabricating the same includes: a substrate; a gate line on the substrate; a data line crossing the gate line to define a pixel region; a thin film transistor connected to the gate line and the data line, the thin film transistor including a gate electrode connected to the gate line, a semiconductor layer whose boundary is within the gate electrode, a source electrode connected to the data line and a drain electrode spaced apart from the source electrode; a passivation pattern covering the data line and the thin film transistor; and a pixel electrode extending from the drain electrode.

In another aspect, the method of fabricating an array substrate for a liquid crystal display device, includes: forming a gate line, a gate electrode connected to the gate line, a gate pad at one end of the gate line on a substrate through a first mask process; forming a gate insulating layer on the gate line, the gate electrode, and the gate pad; forming a semiconductor layer on the gate insulating layer through a second mask process, the boundary of the semiconductor layer is within the gate electrode; and forming a data line crossing the gate line, a source electrode connected to the data line, a drain electrode spaced apart from the source electrode, a pixel electrode extending from the drain electrode, a gate pad terminal contacting the gate pad and a data pad terminal connected to the data line and forming a passivation pattern on the data line, the source electrode and the drain electrode through a third mask process.

It is to be understood that both the foregoing general description and the following detailed description are exemplary and explanatory and are intended to provide further explanation of embodiments of the invention as claimed.

BRIEF DESCRIPTION OF THE DRAWINGS

The accompanying drawings, which are included to provide a further understanding of embodiments of the invention and are incorporated in and constitute a part of this specification, illustrate embodiments of the invention and together with the description serve to explain the principles of embodiments of the invention.

FIGS. 2A to 2I are schematic cross-sectional views along the line II-II' of FIG. 1, showing a fabricating method of an array substrate for a liquid crystal display device using a four-mask process according to the related art;

FIGS. 4A to 4M are schematic cross-sectional views taken along the line IV-IV' of FIG. 3 showing a fabricating method of an array substrate for a liquid crystal display device using a three-mask process according to a first embodiment of the present invention;

DETAILED DESCRIPTION OF THE PREFERRED EMBODIMENTS

Reference will now be made in detail to embodiments which are illustrated in the accompanying drawings. Wherever possible, similar reference numbers will be used to refer to the same or similar parts.

Figure 1:
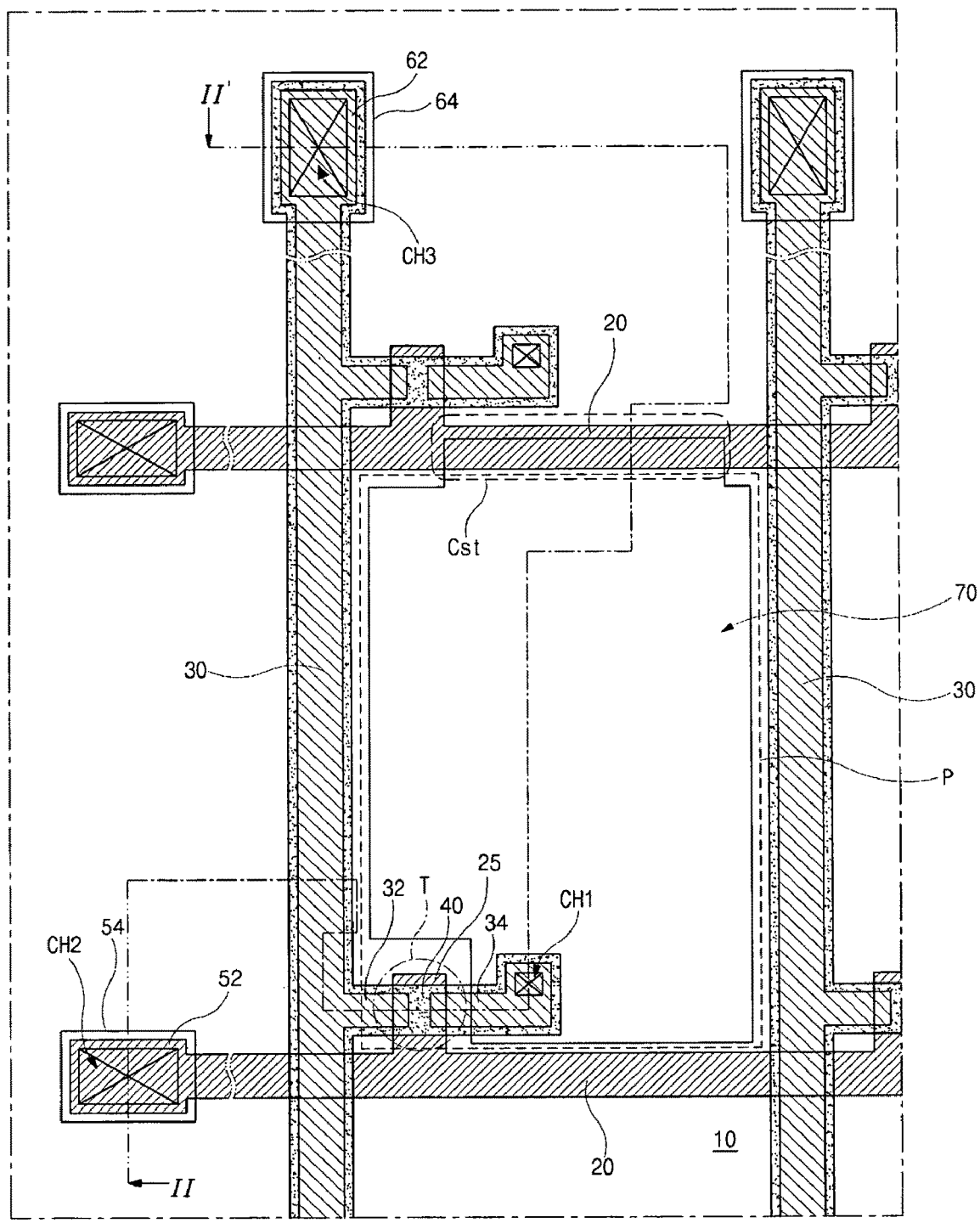
FIG. 1 is a schematic top view showing an array substrate for a liquid crystal display device according to the related art.
Figure 2A:
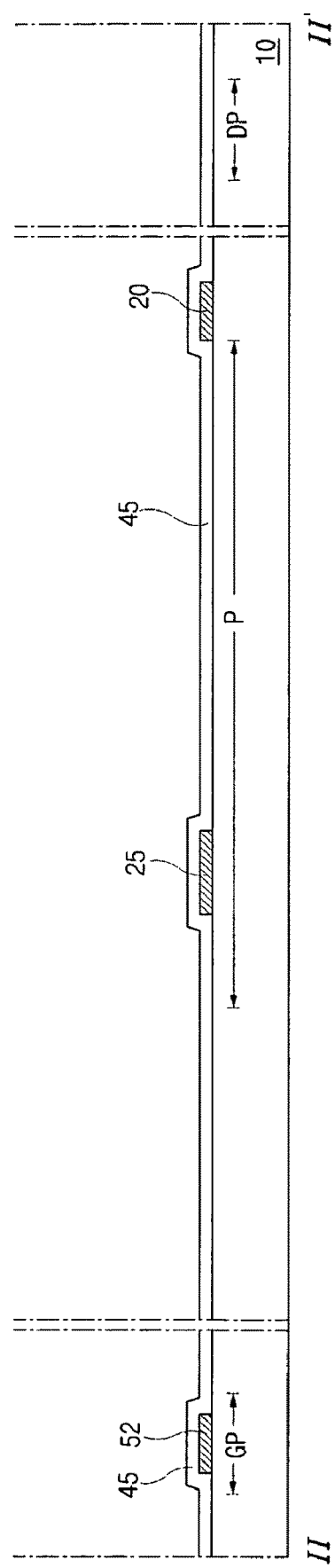
Figure 2B:
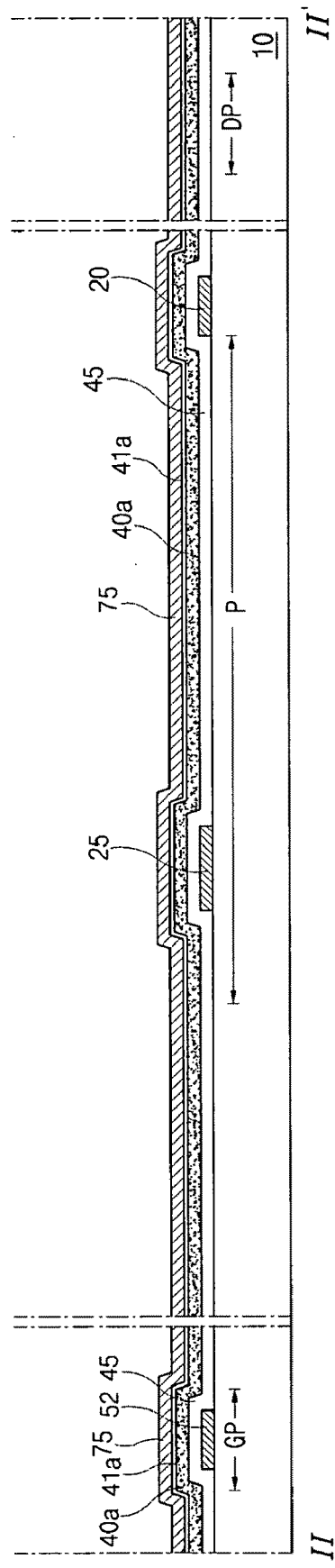
Figure 2C:
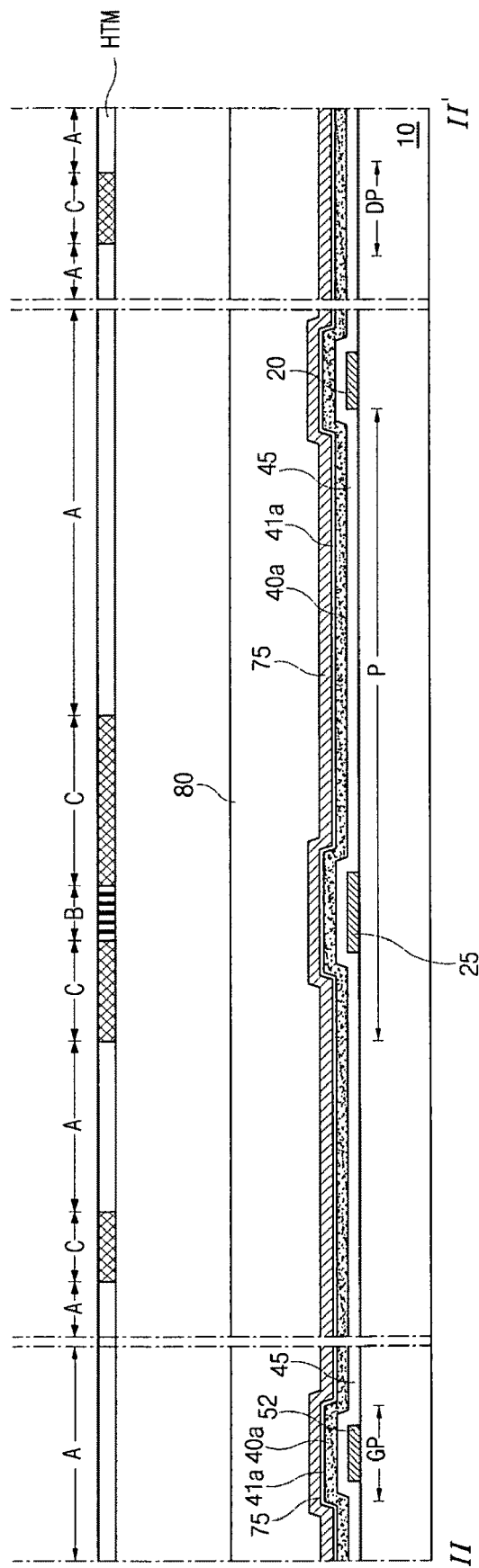
Figure 2D:
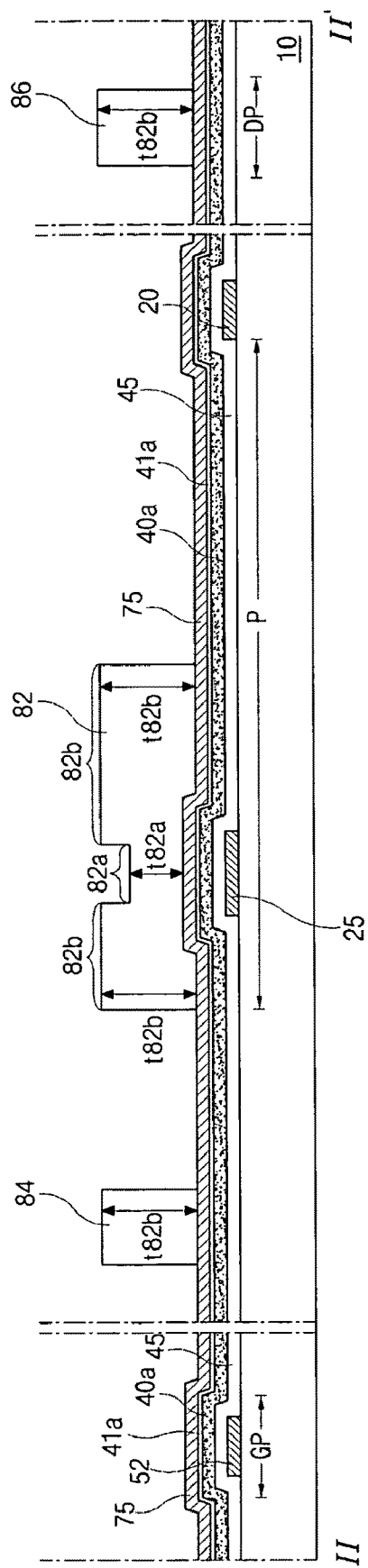
Figure 2G:
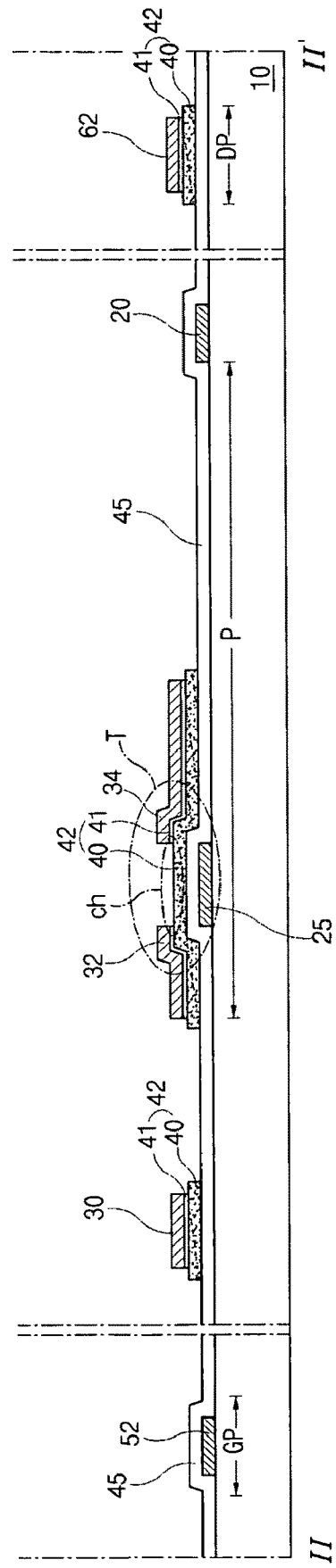
Figure 2H:
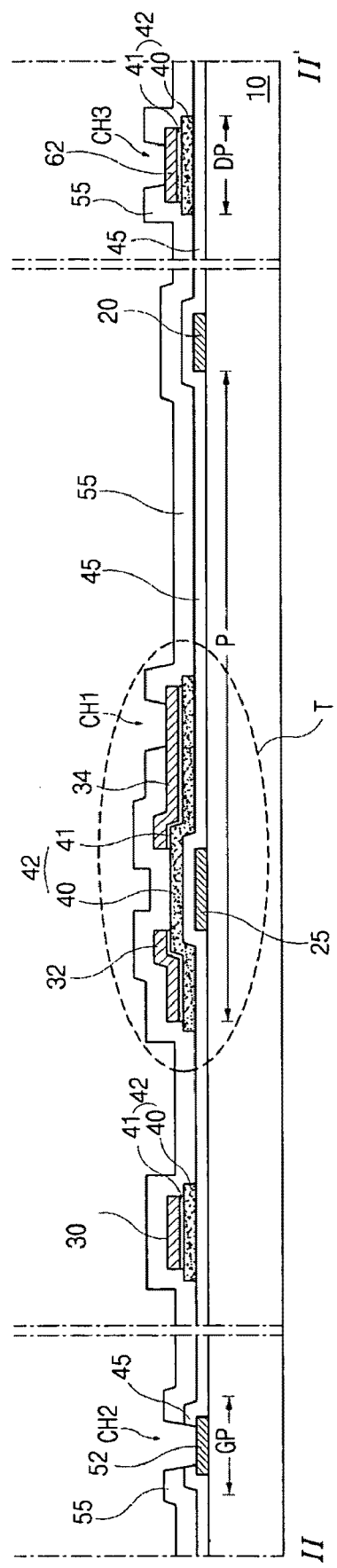
Figure 2I:
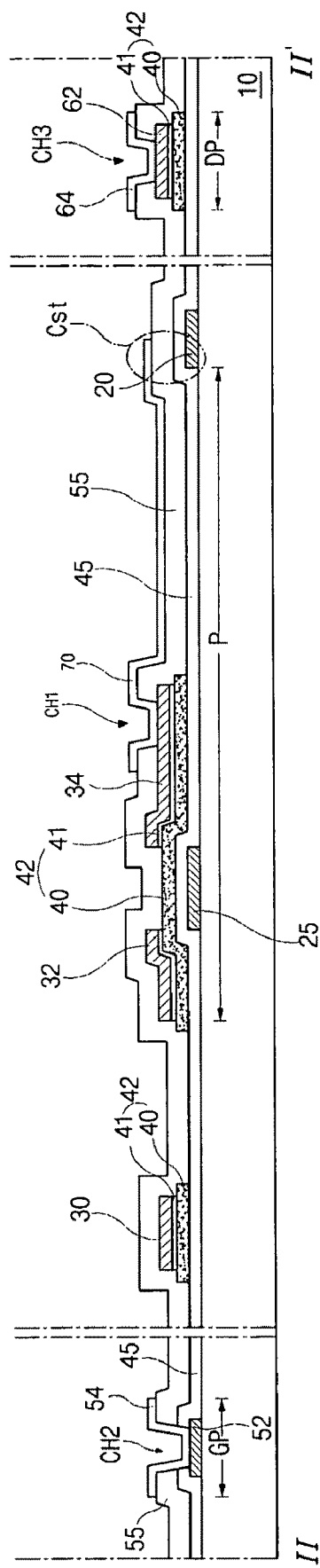
Figure 3:
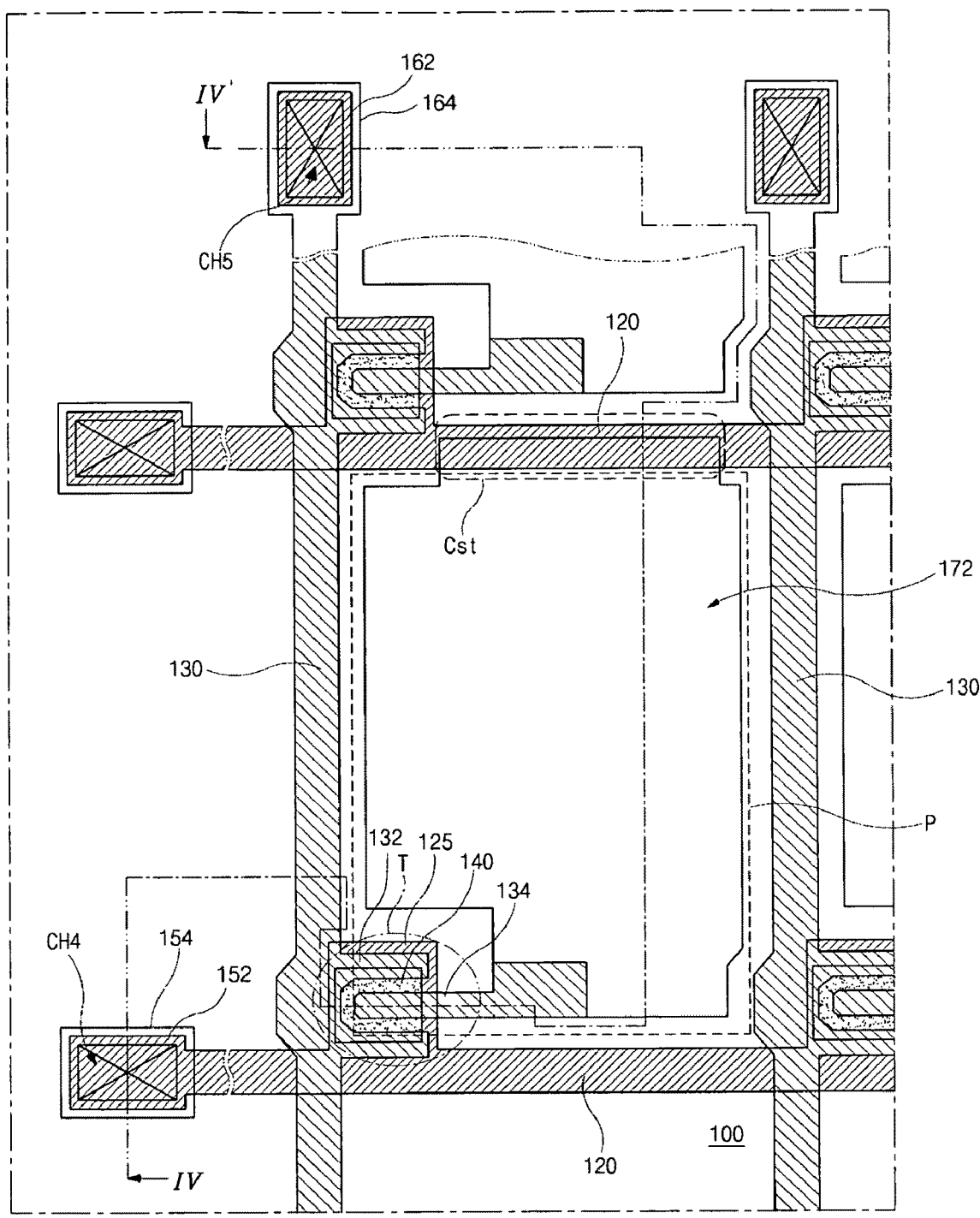
FIG. 3 is a schematic top view showing an array substrate for a liquid crystal display device according to a first embodiment of the present invention.

FIG. 3 is a schematic top view showing an array substrate for a liquid crystal display device according to a first embodiment of the present invention. In FIG. 3, a gate line 120, a gate electrode 125 and a gate pad 152 are formed on a substrate 100. The gate electrode 125 extends from the gate line 120 and the gate pad 152 is formed at one end of the gate line 120. Further, a data line 130, a source electrode 132, a drain electrode 134 and a data pad 162 are formed on the substrate 100. The data line 130 crosses the gate line 120 to define a pixel region P. The source electrode 132 extends from the data line 130 and the drain electrode 134 is spaced apart from the source electrode 132.

FIGS. 4A to 4M are schematic cross-sectional views, which are taken along the line IV-IV' of FIG. 3, showing a fabricating method of an array substrate for a liquid crystal display device using a three-mask process according to a first embodiment of the invention.

The source electrode 132 has a U shape and the drain electrode 134 has a bar shape corresponding to the U shape. Each of the data line 130, the source electrode 132 and the drain electrode 134 includes a double-layered structure having a transparent conductive material layer 170a (of FIG. 4H) and an opaque conductive material layer 175 (of FIG. 4H). The data pad 162 is formed at one end of the data line 130. The gate pad 152 is formed of the same material and in the same layer as the data pad 162. A gate pad terminal 154 on the gate pad 152 is connected to the gate pad 152 through a gate pad contact hole CH4, and a data pad terminal 164 on the data pad 162 is connected to the data pad 162 through a data pad contact hole CH5. The gate pad terminal 154 and the data pad terminal 164 include a transparent conductive material.

A thin film transistor (TFT) T is connected to the gate line 120 and the data line 130. The TFT T includes the gate electrode 125, a semiconductor layer 143 (of FIG. 4K), the source electrode 132 and the drain electrode 134. The semiconductor layer 143 is formed over the gate electrode 125, and the source and drain electrodes 132 and 134 contact the semiconductor layer 143. The semiconductor layer 143 includes an active layer 140 of intrinsic amorphous silicon (a-Si:H) and an ohmic contact layer 141 (of FIG. 4K) of an impurity-doped amorphous silicon (n+ a-Si:H). Since the semiconductor layer 143 is formed using a mask different from a mask for the data line 130, the data pad 162, the source electrode 132 and the drain electrode 134, the semiconductor layer 143 has an island shape and is disposed within the gate electrode 125. As a result, the semiconductor layer 143 of the TFT is not exposed to light from a backlight unit (not shown) and a photocurrent is not generated in the TFT. Therefore, degradation in electric property of the TFT due to the photocurrent is prevented.

Since the transparent conductive material layer 170a is formed under the opaque conductive material layer 175 in the double-layered structure of the source and drain electrodes 132 and 134, the transparent conductive material layer 170a may directly contact the ohmic contact layer 141. The transparent conductive material layer 170a has a work function that is much higher than the ohmic contact layer 141. Accordingly, when the transparent conductive material layer 170a directly contacts the ohmic contact layer 141, the work function difference between the ohmic contact layer 141 and the source and drain electrodes 232 and 234 is great. As a result, the TFT T may have a relatively high contact resistance of the source and drain electrodes 132 and 134 or a rectifying contact, which may be referred to as a Schottky contact and in which currents flow only along a specific direction, instead of an ohmic contact, which may be referred to as a non-rectifying contact or a resistive contact. A buffer metal layer 142 (of FIG. 4K) can be formed between the source and drain electrodes 132 and 134 and the ohmic contact layer 141 to reduce contact resistance so as to obtain an ohmic contact. For example, the buffer metal layer 142 may include molybdenum and has a thickness of about 50 Å.

In another embodiment, when the TFT T has a relatively low contact resistance and an ohmic contact, the buffer metal layer 142 can be omitted. For example, after the ohmic contact layer 141 is formed, the ohmic contact layer 141 may be treated with a plasma to form a very thin silicon nitride (SiNx) layer on a surface of the ohmic contact layer 141 as a buffer separation layer. Then, the source and first drain electrodes 132 and 134 may be formed on the buffer separation layer. The TFT T can still have a relatively low contact resistance and an ohmic contact due to the very thin SiNx layer without the buffer metal layer.

The active layer 140 is exposed between the source and drain electrodes 132 and 134 by partially removing a buffer metal pattern 142b (of FIG. 4J) and an ohmic contact pattern 141b (of FIG. 4J) to define a channel region ch (of FIG. 4K) for current flow.

A passivation layer 158a (of FIG. 4L) is formed through a physical vapor deposition (PVD) method such as a sputtering and patterned using a lift-off method to form a passivation pattern 158 (of FIG. 4M) on the data line 130, the source electrode 132 and the drain electrode 134. In addition, a pixel electrode 172 is formed in the pixel region P. The pixel electrode 172 has the transparent conductive material layer 170a and is connected to the drain electrode 134. Further, the pixel electrode 172 overlaps the gate line 120 corresponding to a neighboring pixel region to define a storage capacitor Cst including an overlapped portion of the gate line 120 as a first capacitor electrode and an overlapped portion of the pixel electrode 172 as a second capacitor electrode.

The array substrate of FIG. 3 is fabricated through a three-mask process, and the semiconductor layer 143 has an island shape within the gate electrode 125. Moreover, the passivation layer 158a formed by a sputtering is patterned using a lift-off process to form a passivation pattern 158.

Figure 4A:
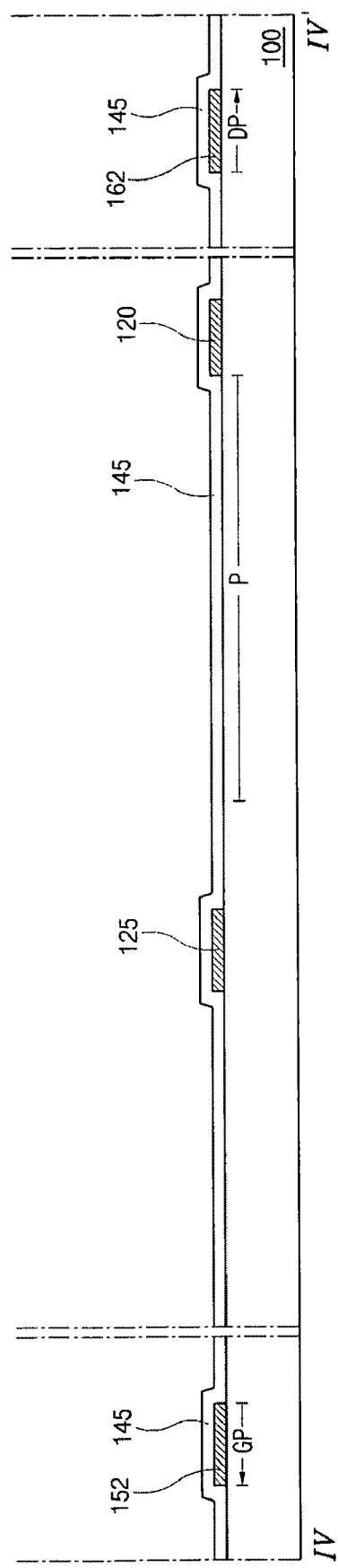

In FIG. 4A showing a first mask process, a gate line 120, a gate electrode 125 and a gate pad 152 are formed on a substrate 100 having a pixel region P, a gate pad region GP and a data pad region DP by depositing and patterning a conductive metallic material such as copper (Cu), molybdenum (Mo), aluminum (Al), aluminum (Al) alloy or chromium (Cr) using a first mask (not shown). Although not shown in FIG. 4A, the gate electrode 125 extends from the gate line 120 and the gate pad 152 is formed in the gate pad region GP at one end of the gate line 120. In addition, a data pad 162 having an island shape is formed in the data pad region DP on the substrate 100. The data pad 162 is formed of the same material and in the same layer as the gate line 120. The data pad 162 is disposed to correspond to one end of a data line 130 (of FIG. 3) that is formed in a subsequent process. Alternatively, the data pad 162 may be omitted and only a data pad terminal 164 (of FIG. 4M) may be formed in the data pad region DP. A gate insulating layer 145 is formed on the gate line 120, the gate electrode 125, the gate pad 152 and the data pad 162. The gate insulating layer 145 includes an inorganic insulating material such as silicon nitride (SiNx) and silicon oxide (SiO$_2$).

Figure 4B:
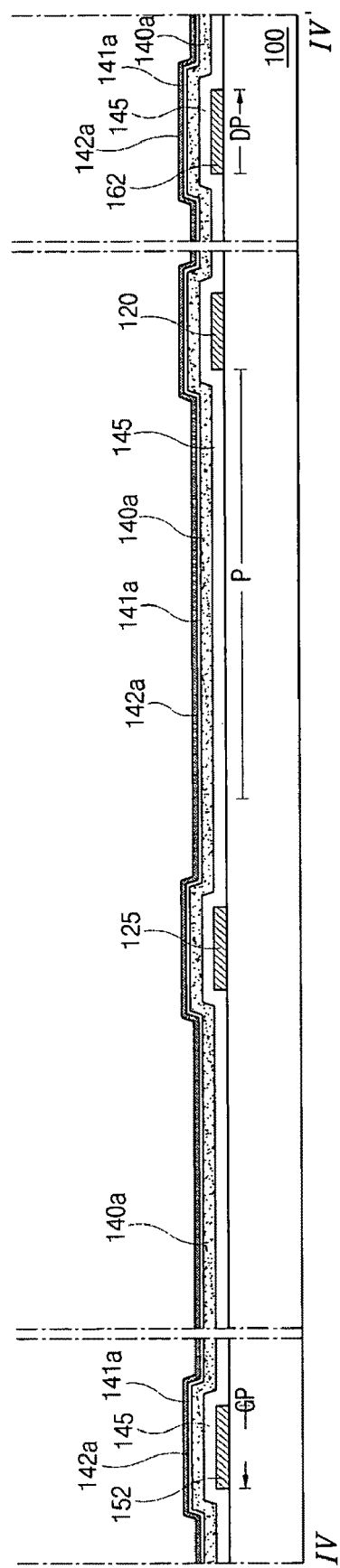

FIG. 4B to 4G show a second mask process. In FIG. 4B, an intrinsic silicon layer 140a and a doped silicon layer 141a are sequentially formed on the gate insulating layer 145. The intrinsic silicon layer 140a includes intrinsic amorphous silicon (a-Si:H) and the doped silicon layer 141a includes impurity-doped amorphous silicon layer (n+ a-Si:H). For example, the intrinsic silicon layer 140a and the doped silicon layer 141a may be sequentially formed in the chamber where the gate insulating layer 145 is formed using a chemical vapor deposition (CVD) method. Next, a buffer metallic material layer 142a is formed on the doped silicon layer 141a. The buffer metallic material layer 142a may include molybdenum and have a thickness of about 50 Å.

Figure 4C:
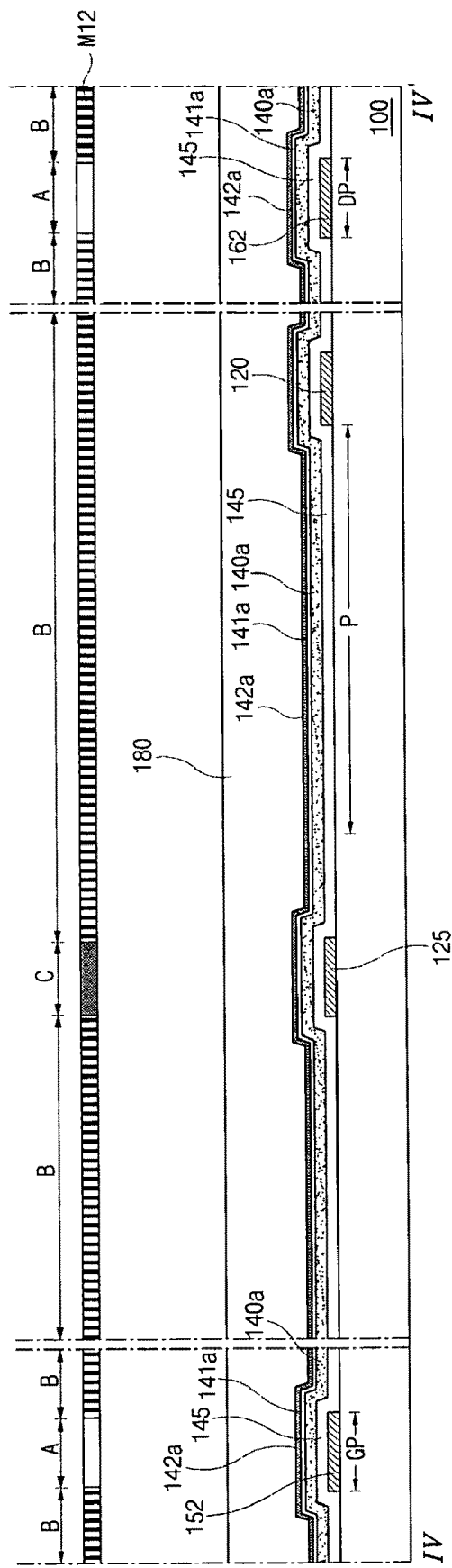

In FIG. 4C, a first photoresist (PR) layer 180 is formed on the buffer metallic material layer 142a, and a second mask M12 is disposed over the first PR layer 180. The second mask M12 has a transmissive area A, a half-transmissive area B and a blocking area C. Transmittance of the half-transmissive area B is smaller than transmittance of the transmissive area A and greater than transmittance of the blocking area C. The transmittance of the half-transmissive area B may be obtained by forming a half-transmissive film or forming an opaque slit pattern on a quartz plate. Accordingly, when the first PR layer 180 is exposed to light through the second mask M12, areas of first PR layer 180 directly underneath the half-transmissive area B are incompletely exposed. In addition, the first PR layer 180 directly underneath the transmissive area A are completely exposed and the first PR layer 180 directly underneath the blocking area C are not exposed. The blocking area C is disposed to correspond to a region having a thin film transistor (TFT) T (of FIG. 3) formed in a subsequent process, and the transmissive area A is disposed to correspond to the gate pad region GP and the data pad region DP. The half-transmissive area B is disposed to correspond to the other regions of the substrate 100.

In FIG. 4D, after the first PR layer 180 (of FIG. 4C) is exposed through the second mask M12 (of FIG. 4C), the exposed first PR layer 180 is developed to form a first PR pattern 182. The first PR pattern 182 has a first portion 182a corresponding to the half-transmissive area B of the second mask M12 and a second portion 182b corresponding to the blocking area C of the second mask M12. Accordingly, the first portion 182a has thickness t182a smaller than the thickness of the second portion t182b. The first PR layer 180 directly underneath the transmissive area A of the second mask M12 is completely removed to expose the buffer metallic material layer 142a.

Figure 4E:
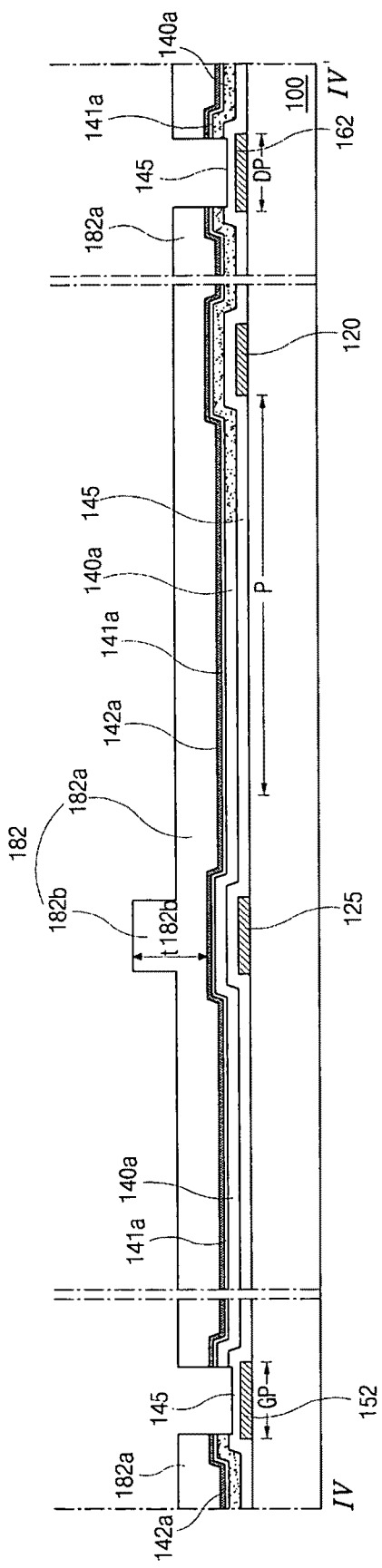

In FIG. 4E, the buffer metallic material layer 142a, the doped silicon layer 141a, the intrinsic silicon layer 140a and the gate insulating layer 145 are sequentially patterned using the first PR pattern 182 as an etch mask. Here, the gate insulating layer 145 corresponding to the gate pad region GP and the data pad region DP is partially removed so that a portion of the gate insulating layer 145 can remain. For example, the remaining gate insulating layer 145 may have a thickness less than a half of a thickness t145 of the unpatterned gate insulating layer 145. Since the gate insulating layer 145 is partially removed, a subsequent pad opening step for the gate pad 152 or the data pad 162 may be stably performed. An etch rate of a material for the gate insulating layer 145, for example, silicon nitride (SiNx) or silicon oxide ($SiO_2$) may be lower than an etch rate of a material for the doped silicon layer 141a and the intrinsic silicon layer 140a. Accordingly, when the gate insulating layer 145 is not removed, the gate pad 152 or the data pad 162 may not be exposed through the gate insulating layer 145 in the subsequent pad opening step or a process time of the subsequent pad opening step may be relatively long. In addition, when the gate insulating layer 145 is completely removed, the gate pad 152 or the data pad 162 may be deteriorated in the subsequent pad opening step.

Figure 4F:
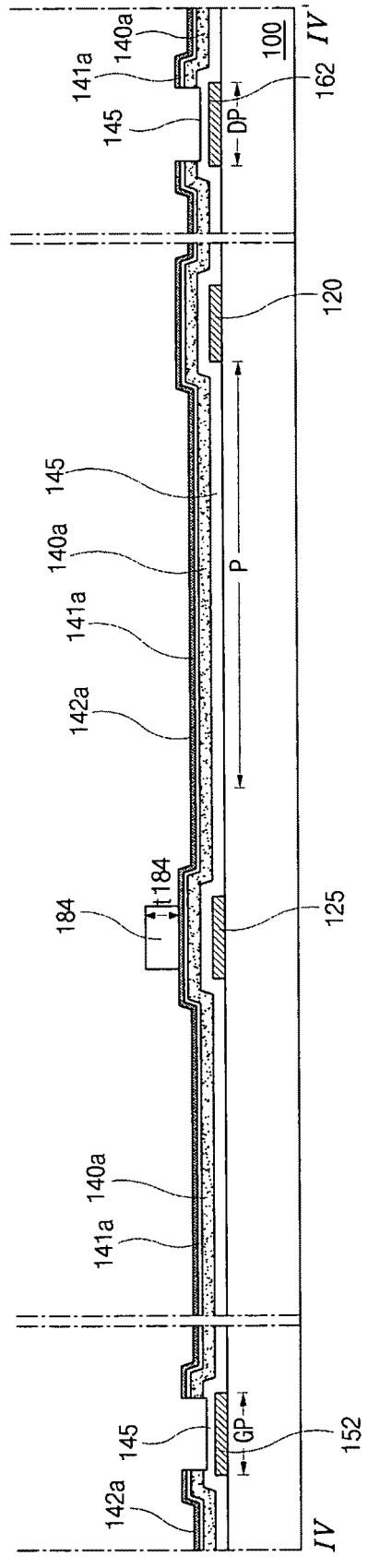

In FIG. 4F, the first PR pattern 182 (of FIG. 4E) is partially removed by an ashing. As a result, the first portion 182a (of FIG. 4E) of the first PR pattern 182 is completely removed to expose the buffer metallic material layer 142a, and the second portion 182b (of FIG. 4E) of the first PR pattern 182 remains to form a second PR pattern 184 having a thickness t184 that is less than the thickness t182b of the first PR pattern 182 (of FIG. 4E).

Figure 4G:
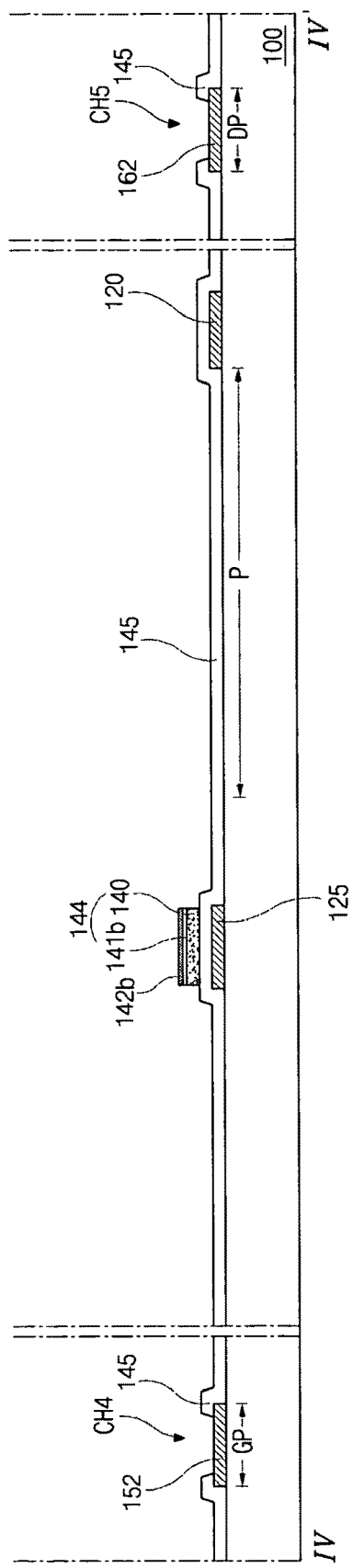

In FIG. 4G, the buffer metallic material layer 142a, the doped silicon layer 141a and the intrinsic silicon layer 140a are patterned using the second PR pattern 184 as an etch mask to form a semiconductor pattern 144 and a buffer metal pattern 142b over the gate electrode 125. The semiconductor pattern 144 has an island shape and includes an active layer 140 of intrinsic amorphous silicon an, an ohmic contact pattern 141b of impurity-doped amorphous silicon. While the doped silicon layer 142a (of FIG. 4F) and the intrinsic silicon layer 141a are patterned, the remaining gate insulating layer 145 in the gate pad region GP and the data pad region DP is completely removed to form a gate pad contact hole CH4 exposing the gate pad 152 and a data pad contact hole CH5 exposing the data pad 162.

In the first embodiment of the present invention, since the active layer 140 of the semiconductor pattern 144 formed during the second mask process has an island shape within the gate electrode 125, exposure of the active layer 140 to a backlight unit is prevented and deterioration of electrical properties of the TFT T is also prevented. As a result, display quality of an LCD device is improved. In addition, since the active layer 140 of the semiconductor pattern 144 has an island shape within the gate electrode 125, an area for a black matrix (not shown) preventing light leakage is reduced. Moreover, since the data line 130, the source electrode 132 and the drain electrode 134 are formed directly on the substrate 100 without a protruded semiconductor layer therebetween, the area for the black matrix is further reduced and deterioration such as wavy noise due to interference between the protruded semiconductor layer and the pixel electrode is prevented.

Figure 4H:
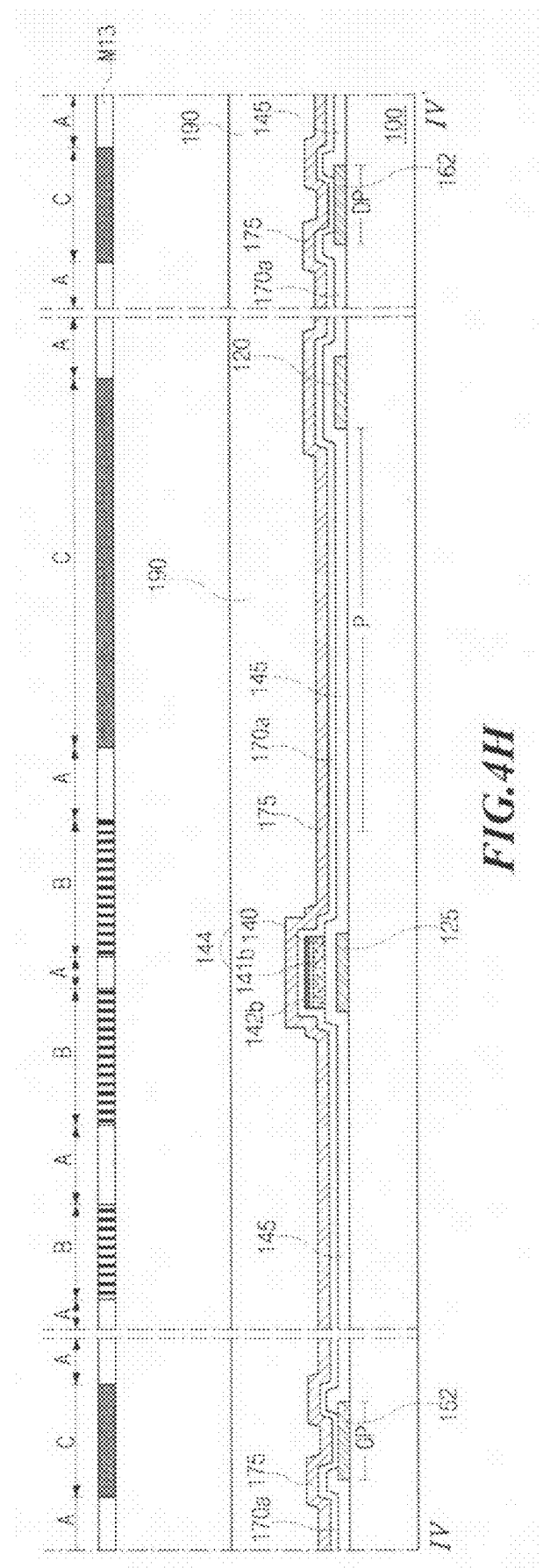

Next, the second PR pattern 184 (of FIG. 4F) is removed through a stripping step, thereby the second mask process is finished. FIGS. 4H to 4M show a third mask process. In FIG. 4H, a transparent conductive material layer 170a and an opaque conductive material layer 175 are sequentially formed on the buffet metal pattern 142b and the gate insulating layer 145. For example, the transparent conductive material layer 170a may include one of indium-tin-oxide (ITO) and indium-zinc-oxide (IZO). In addition, the opaque conductive material layer 175 may include at least one of copper (Cu), molybdenum (Mo), molybdenum alloy (Mo) such as molybdenum titanium (MoTi), aluminum (Al), aluminum (Al) alloy such as aluminum neodymium (AlNd) and chromium (Cr). Next, a second PR layer 190 is formed on the opaque conductive material layer 175 and a third mask M13 is disposed over the second PR layer 190. The third mask M13 has a transmissive area A, a half-transmissive area B and a blocking area C. Transmittance of the half-transmissive area B is smaller than transmittance of the transmissive area A and greater than transmittance of the blocking area C. The transmittance of the half-transmissive area B may be obtained by forming a half-transmissive film or forming an opaque slit pattern on a quartz plate. Accordingly, when the second PR layer 190 is exposed to light through the third mask M13, the areas of the second PR layer 190 directly underneath the half-transmissive area B are incompletely exposed. In addition, areas of the second PR layer 190 directly underneath the transmissive area A are completely exposed and areas of the second PR layer 190 directly underneath the blocking area C are not exposed. The blocking area C is disposed to correspond to the pixel region P, the gate pad region GP and the data pad region DP, and the half-transmissive area B is disposed to correspond to boundary regions of the buffer metal pattern 142b and the data line 130 (of FIG. 3) formed in a subsequent process. The transmissive area A is disposed to correspond to a central region of the buffer metal pattern 142b and the other regions of the substrate 100.

Figure 4I:
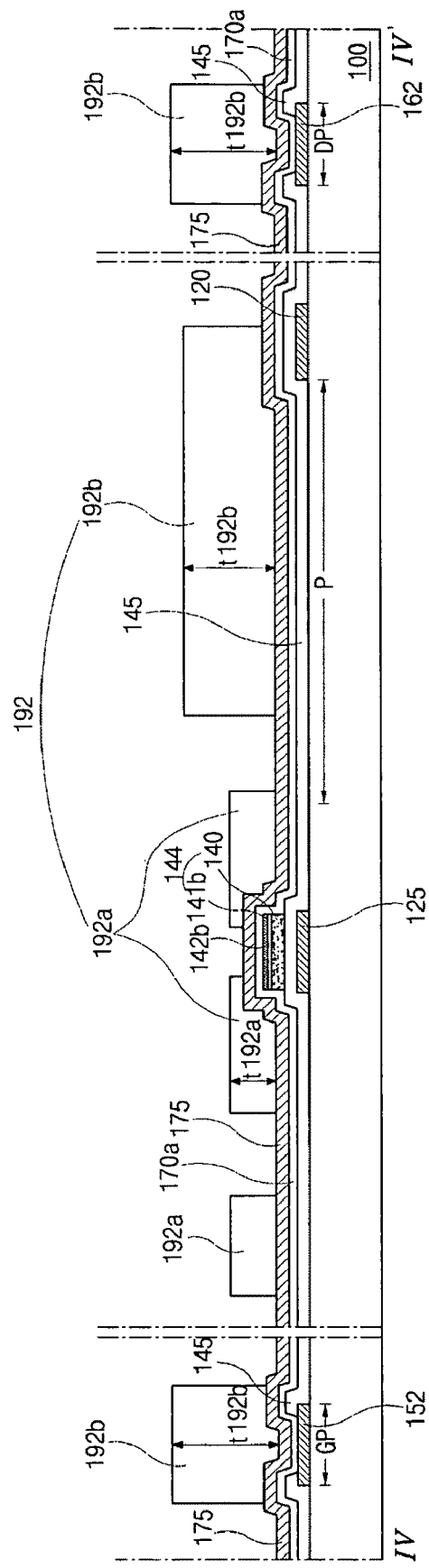

In FIG. 4I, after the second PR layer 190 (of FIG. 4H) is exposed through the third mask M13 (of FIG. 4H), the exposed second PR layer 190 is developed to obtain a third PR pattern 192. The third PR pattern 192 has a first portion 192a corresponding to the half-transmissive area B of the third mask M13 and a second portion 192b corresponding to the blocking area C of the third mask M13. Accordingly, the first portion 192a has thickness t192a smaller than the thickness t192b of the second portion 192b. The second PR layer 190 corresponding to the transmissive area A of the third mask M13 is completely removed to expose the opaque conductive material layer 175.

Figure 4J:
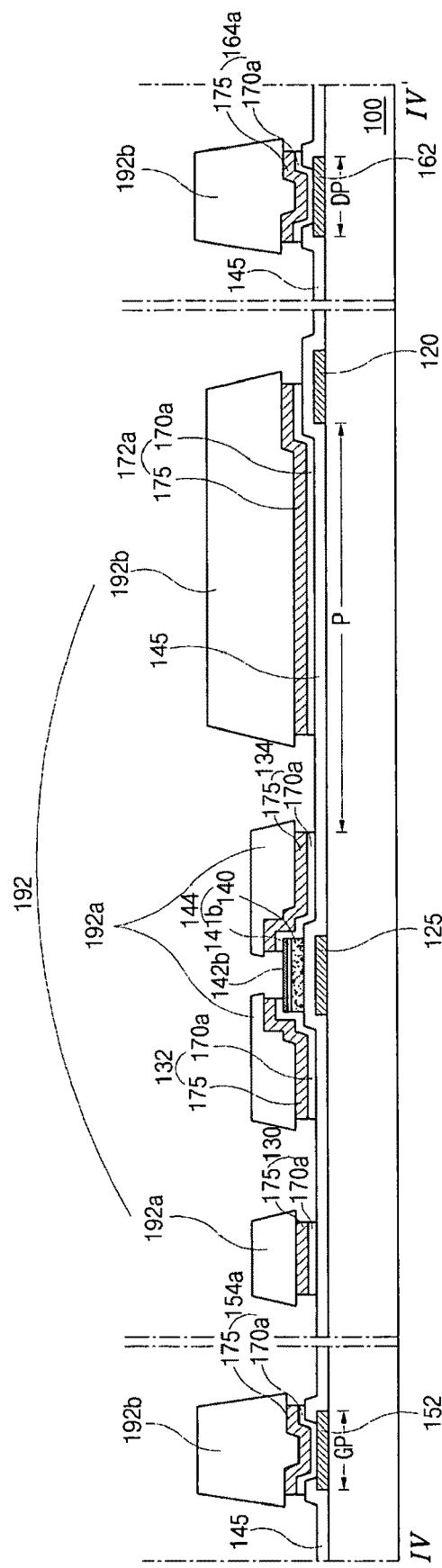

In FIG. 4J, the opaque conductive material layer 175 and the transparent conductive material layer 170a are sequentially patterned using the third PR pattern 192 as an etch mask to form a data line 130, a source electrode 132, a drain electrode 134, a pixel electrode pattern 172a, a gate pad terminal pattern 154a and a data pad terminal pattern 164a. For example, the opaque conductive material layer 175 and the transparent conductive material layer 170a may be patterned through an isotropic wet etching method. Accordingly, the opaque conductive material layer 175 and the transparent conductive material layer 170a may be over-etched to form an undercut shape (not shown) in which the sides of the patterned opaque conductive material layer 175 and the patterned transparent conductive material layer 170a are disposed inside sides of the third PR pattern 192. As a result, a bottom surface of side portions of the third PR pattern 192 is exposed. During a subsequent lift-off process, where a passivation layer is formed on a PR pattern and then the passivation layer and the PR pattern are removed together, a stripping solution may easily permeate through the exposed bottom surface of the PR pattern.

Each of the data line 130, the source electrode 132, the drain electrode 134, the pixel electrode pattern 172a, the gate pad terminal pattern 154a and the data pad terminal pattern 164a has a double-layered structure of the opaque conductive material layer 175 and the transparent conductive material layer 170a. The source and drain electrodes 132 and 134 are disposed at both sides of the buffer metal pattern 142b, and the pixel electrode pattern 172a is disposed in the pixel region P. In addition, the pixel electrode pattern 172a extends to overlap the gate line 120 in a previous pixel region P, i.e., a previous gate line. The gate pad terminal pattern 154a and the data pad terminal pattern 164a contact the gate pad 152 and the data pad 162, respectively. Each of the data line 130, the source electrode 132, the drain electrode 134, the pixel electrode pattern 172a, the gate pad terminal pattern 154a and the data pad terminal pattern 164a defines an undercut shape with the third PR pattern 192, and the bottom surface of the side portions of the third PR pattern 192 is exposed.

Figure 4K:
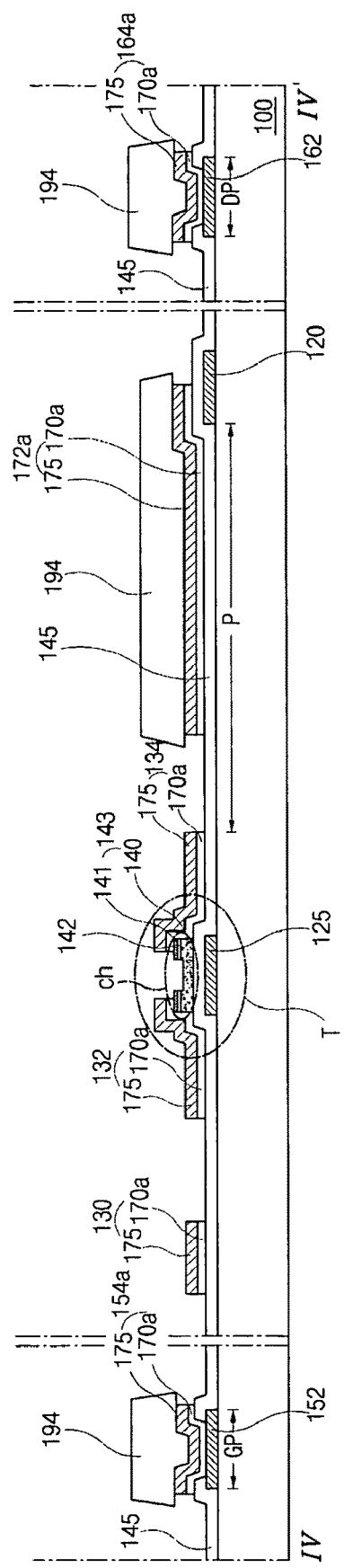

In FIG. 4K, the buffer metal pattern 142b (of FIG. 4J) and the ohmic contact pattern 141b (of FIG. 4J) are patterned using the third PR pattern 192 (of FIG. 4J) as an etch mask. Accordingly, a buffer metal layer 142 and an ohmic contact layer 141 are formed at both sides of the active layer 140, and the active layer 140 is exposed to define a channel region ch as a current path of a TFT T. The active layer 140 and the ohmic contact layer 141 constitute a semiconductor layer 143, and the gate electrode 125, the semiconductor layer 143, the source electrode 132 and the drain electrode 134 constitute the TFT T. The buffer metal layer 142 reduces contact resistance and work function difference between the transparent conductive material layer 170a of the source and drain electrodes 132 and 134 and the ohmic contact layer 141 so that an ohmic contact can be obtained and an electric property of the TFT T can be improved. Next, the third PR pattern 192 is partially removed by an ashing. As a result, the first portion 192a of the third PR pattern 192 is completely removed to expose the data line 130, the source electrode 132 and the drain electrode 134, and the second portion 192b of the third PR pattern 192 remains to form a fourth PR pattern 194 having a reduced thickness. As a result, the fourth PR pattern 194 is formed on the pixel electrode pattern 172a, the gate pad terminal pattern 154a and the data pad terminal pattern 164a.

In FIG. 4L, a passivation layer 158a is formed on the fourth PR pattern 194, the data line 130, the source electrode 132 and the drain electrode 134. The passivation layer 158a includes one of inorganic insulating material such as silicon nitride (SiNx) and silicon oxide ($SiO_2$). In addition, the passivation layer 158a is formed through a physical vapor deposition (PVD) method, for example, a sputtering method.

A passivation layer formed through a chemical vapor deposition (CVD) method has disadvantages. Since the CVD method requires a temperature over about 350° C., the fourth PR pattern 194 of an organic material having a thermal resistance of about 150° C. may fall down while the passivation layer is formed through the CVD method. The step height t194 of the fourth PR pattern 194 may be reduced or the step of the fourth PR pattern 194 becomes warped. Accordingly, the passivation layer formed through the CVD method may cover the entire surface of the substrate 100 without break, and the stripping solution for the fourth PR pattern 194 may not permeate through the passivation layer during a subsequent lift-off process. As a result, the passivation layer through the CVD method may leave undesired residues of the fourth PR pattern 194 and the passivation layer in the subsequent lift-off process. Moreover, the undesired residues of the fourth PR pattern 194 may react with liquid crystal materials in a subsequent process to reduce display quality of the LCD device.

To solve the above problems of the passivation layer through a CVD method, the passivation layer 158a of the first embodiment of the present invention is formed through a sputtering method. Since the passivation layer 158a through the sputtering method is formed in a temperature lower than about 150° C., the fourth PR pattern 194 is not deformed and does not deform or lose its shape so as to fall down. In addition, the passivation layer 158a through the sputtering method may be applied to a substrate including a flexible material such as plastic. Since the height and the shape of the fourth PR pattern 194 are not changed, the passivation layer 158a does not cover the entire surface of the substrate 100 without break. Instead, the passivation layer 158a has breaks at boundaries of the fourth PR pattern 194 due to the high step height. As a result, a portion of the passivation layer 158a on the fourth PR pattern 194 is not connected to and is separated from the other portion of the passivation layer 158a.

In FIG. 4M, the stripping solution is applied to the substrate 100 having the passivation layer 158a (of FIG. 4L). For example, the stripping solution may include a stripper for a photoresist material. The stripping solution permeates through the bottom surface of the fourth PR pattern 194, and the portion of the passivation layer 158a on the fourth PR pattern 194 is removed together with the fourth PR pattern 194 (of FIG. 4L). As a result, the other portion of the passivation layer 158a remains to form a passivation pattern 158, and the pixel electrode pattern 172a, the gate pad terminal pattern 154a and the data pad terminal pattern 164a are exposed after the lift-off process. Next, the opaque conductive material layer 175 of the pixel electrode pattern 172a, the gate pad terminal pattern 154a and the data pad terminal pattern 164a is removed using the passivation pattern 158 as an etch mask to form a pixel electrode 172, a gate pad terminal 154 and a data pad terminal 164.

Accordingly, in the array substrate of the first embodiment of the present invention fabricated through a three-mask process, since the data line 130, the source electrode 132 and the drain electrode 134 are covered with the passivation pattern 158, deterioration due to particles is prevented and reliability of the LCD device is improved. In addition, each of the data line 130, the source electrode 132 and the drain electrode 134 includes the opaque conductive material layer 175 and the transparent conductive material layer 170a, while each of the pixel electrode 172, the gate pad terminal 154 and the data pad terminal 164 includes the transparent conductive material layer 170a.

The pixel electrode 172 overlaps the previous gate line 120 to define a storage capacitor Cst including the overlapped portion of the previous gate line 120 as a first capacitor electrode, the overlapped portion of the pixel electrode 172 as a second capacitor electrode and the gate insulating layer 145 as a dielectric layer. Since only the gate insulating layer 145 relatively thin is used as a dielectric layer, a capacitance of the storage capacitor Cst is maximized and an area for the storage capacitor Cst is minimized.

In the array substrate according to the first embodiment of the present invention, since the semiconductor layer of the TFT has an island shape within the gate electrode, electric properties of the TFT are improved and its aperture ratio increases. In addition, since the data line, the source electrode and the drain electrode are covered with the passivation pattern, reliability of the LCD device is improved. Further, since the passivation pattern is formed through the sputtering method, degradation in the lift-off process is minimized.

In the array substrate according to the first embodiment of the present invention, however, since the pixel electrode is formed to correspond to a substantially entire pixel region, there exists a limitation in area for permeation of the stripping solution. In an in-plane switching (IPS) mode LCD device, the pixel electrode and the common electrode are alternately formed in the pixel region of the array substrate. Accordingly, the array substrate for an IPS mode LCD device has advantages in a fabricating process according to the present invention.

Figure 5:
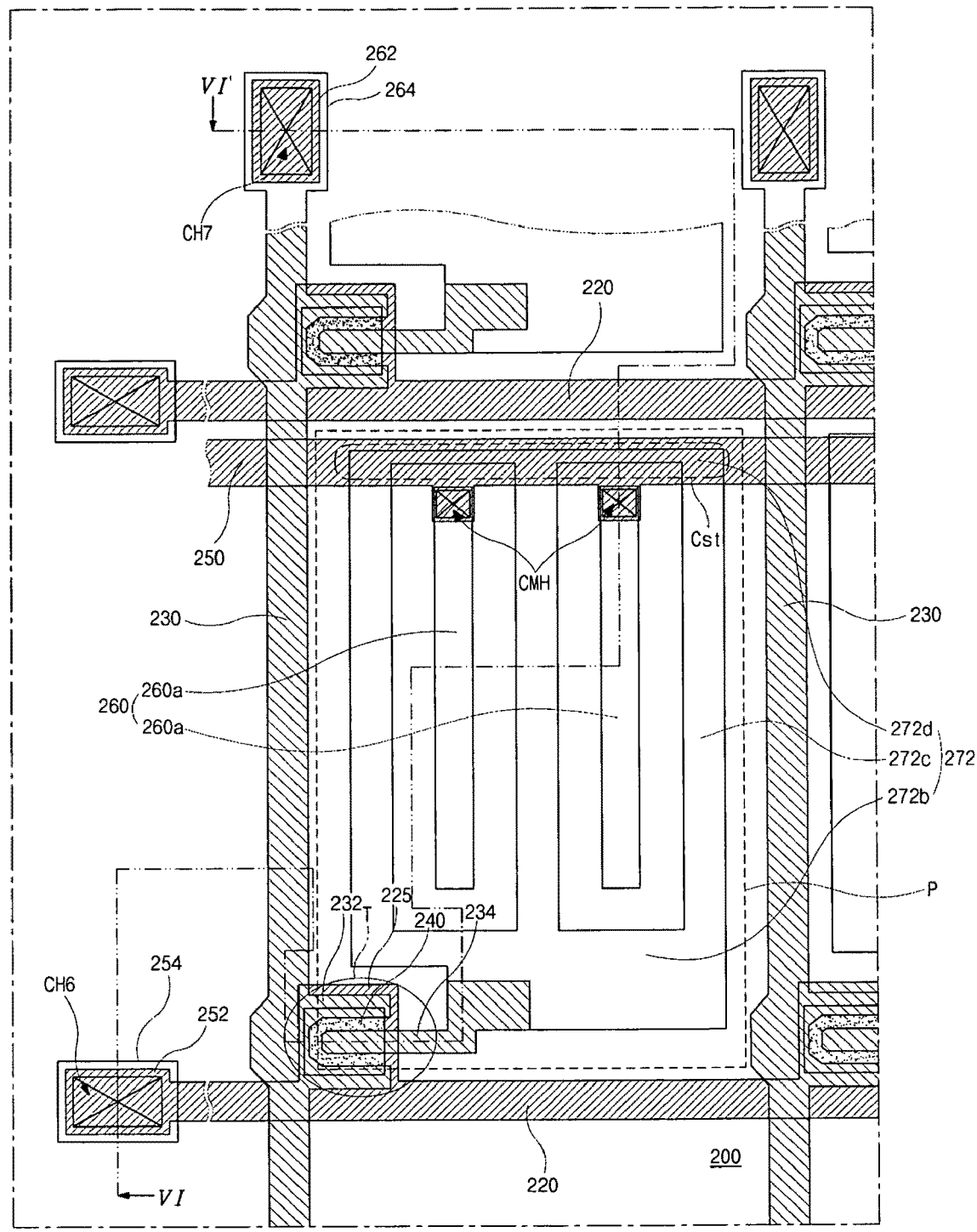
FIG. 5 is a schematic top view showing an array substrate for a liquid crystal display device according to a second embodiment of the present invention.

FIG. 5 is a schematic top view showing an array substrate for a liquid crystal display device according to a second embodiment of the present invention. In the array substrate according to the second embodiment of the present invention, since common electrodes and pixel electrodes alternate with each other in a pixel region, a lift-off process is performed more effectively. In addition, since each of the common electrode and the pixel electrode includes a transparent conductive material, brightness is further improved.

FIGS. 6A to 6M are schematic cross-sectional views taken along the line VI-VI' of FIG. 5 show a fabricating method of an array substrate for a liquid crystal display device using a three-mask process according to a second embodiment of the present invention.

In FIG. 5, a gate line 220, a gate electrode 225, a gate pad 252 and a common line 250 are formed on a substrate 200. The gate electrode 225 extends from the gate line 220 and the gate pad 252 is formed at one end of the gate line 220. The common line 250 is parallel to and spaced apart from the gate line 220. Further, a data line 230, a source electrode 232, a drain electrode 234 and a data pad 262 are formed on the substrate 200. The data line 230 crosses the gate line 220 to define a pixel region P. The source electrode 232 extends from the data line 230 and the drain electrode 234 is spaced apart from the source electrode 232. The source electrode 232 has a U shape and the drain electrode 234 has a bar shape corresponding to the U shape. Each of the data line 230, the source electrode 232 and the drain electrode 234 includes a double-layered structure having a transparent conductive material layer 270a (of FIG. 6H) and an opaque conductive material layer 275 (of FIG. 6H). The data pad 262 is formed at one end of the data line 230. The gate pad 252 is formed of the same material and in the same layer as the data pad 262. A gate pad terminal 254 on the gate pad 252 is connected to the gate pad 252 through a gate pad contact hole CH6, and a data pad terminal 264 on the data pad 262 is connected to the data pad 262 through a data pad contact hole CH7. The gate pad terminal 254 and the data pad terminal 264 include a transparent conductive material.

A thin film transistor (TFT) T is connected to the gate line 220 and the data line 230. The TFT T includes the gate electrode 225, a semiconductor layer 243 (of FIG. 6K), the source electrode 232 and the drain electrode 234. The semiconductor layer 243 is formed over the gate electrode 225, and the source and drain electrodes 232 and 234 contact the semiconductor layer 243. The semiconductor layer 243 includes an active layer 240 of intrinsic amorphous silicon (a-Si:H) and an ohmic contact layer 241 (of FIG. 6K) of an impurity-doped amorphous silicon (n+ a-Si:H). Since the semiconductor layer 243 is formed using a mask different from a mask for the data line 230, the data pad 262, the source electrode 232 and the drain electrode 234, the semiconductor layer 243 has an island shape and is disposed within the gate electrode 225. As a result, the semiconductor layer 243 of the TFT T is not exposed to light from a backlight unit (not shown) and a photocurrent is not generated in the TFT T. Therefore, degradation in electric property of the TFT T due to the photocurrent is prevented.

Since the transparent conductive material layer 270a (of FIG. 6H) is formed under the opaque conductive material layer 275 (of FIG. 6H) in the double-layered structure of the source and drain electrodes 232 and 234, the transparent conductive material layer 270a may directly contact the ohmic contact layer 241. The transparent conductive material layer 270a has a work function much higher than the ohmic contact layer 241. Accordingly, when the transparent conductive material layer 270a directly contacts the ohmic contact layer 241, the work function difference between the ohmic contact layer 241 and the source and drain electrodes 232 and 234 is large. As a result, the TFT T may have a relatively high contact resistance of the source and drain electrodes 232 and 234 or a rectifying contact instead of an ohmic contact. A buffer metal layer 242 (of FIG. 6K) can be formed between the source and drain electrodes 232 and 234 and the ohmic contact layer 241 to reduce contact resistance so as to obtain an ohmic contact. For example, the buffer metal layer 242 may include molybdenum and have a thickness of about 50 Å.

In another embodiment, when the TFT T has a relatively low contact resistance and an ohmic contact, the buffer metal layer 242 can be omitted. For example, after the ohmic contact layer 241 is formed, the ohmic contact layer 241 may be treated with a plasma to form a very thin silicon nitride (SiNx) layer on a surface of the ohmic contact layer 241 as a buffer separation layer. Then, the source and first drain electrodes 232 and 234 may be formed on the buffer separation layer. The TFT T can still have a relatively low contact resistance and an ohmic contact due to the very thin SiNx layer without the buffer metal layer.

The active layer 240 is exposed between the source and drain electrodes 232 and 234 by partially removing a buffer metal pattern 242b (of FIG. 6J) and an ohmic contact pattern 241b (of FIG. 6J) to define a channel region ch (of FIG. 6K) for current flow.

The passivation layer 258a (of FIG. 6L) is formed through a physical vapor deposition (PVD) method such as a sputtering and patterned using a lift-off method to form a passivation pattern 258 (of FIG. 6M) on the data line 230, the source electrode 232 and the drain electrode 234.

A pixel electrode 272 connected to the drain electrode 234 is formed in the pixel region P. The pixel electrode 272 includes an extending portion 272b, a plurality of vertical portions 272c having a bar shape and a connecting portion 272d. The extending portion 272b extends from the drain electrode 234, and the plurality of vertical portions 272c vertically extend from the extending portion 272b. The connecting portion 272d connects the plurality of vertical portions 272c. Further, a common electrode 260 including a plurality of vertical portions 260a is formed in the pixel region P. Each of the plurality of vertical portions 260a has a bar shape. The plurality of vertical portions 260a of the common electrode 260 are connected to the common line 250 through a common contact hole CMH. The plurality of vertical portions 260a of the common electrodes 260 alternate with the plurality of vertical portions 272c of the pixel electrode 272 in the pixel region P.

Figure 6A:
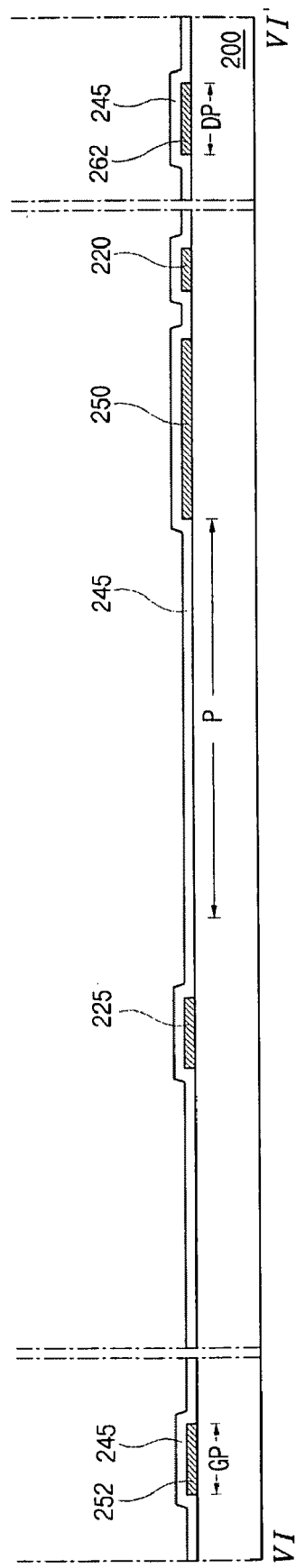
FIGS. 6A to 6M are schematic cross-sectional views taken along the line VI-VI' of FIG. 5 showing a fabricating method of an array substrate for a liquid crystal display device using a three-mask process according to a second embodiment of the present invention.
Figure 6B:
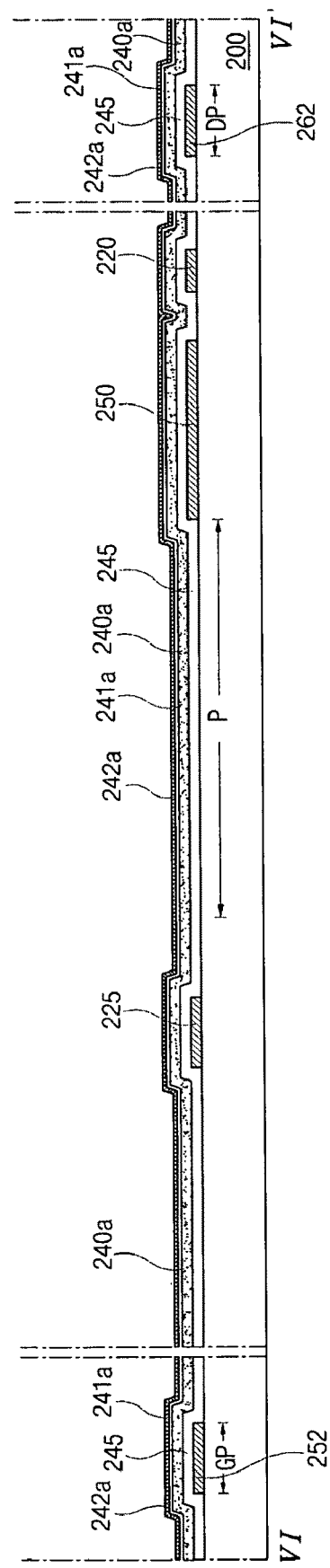
Figure 6C:
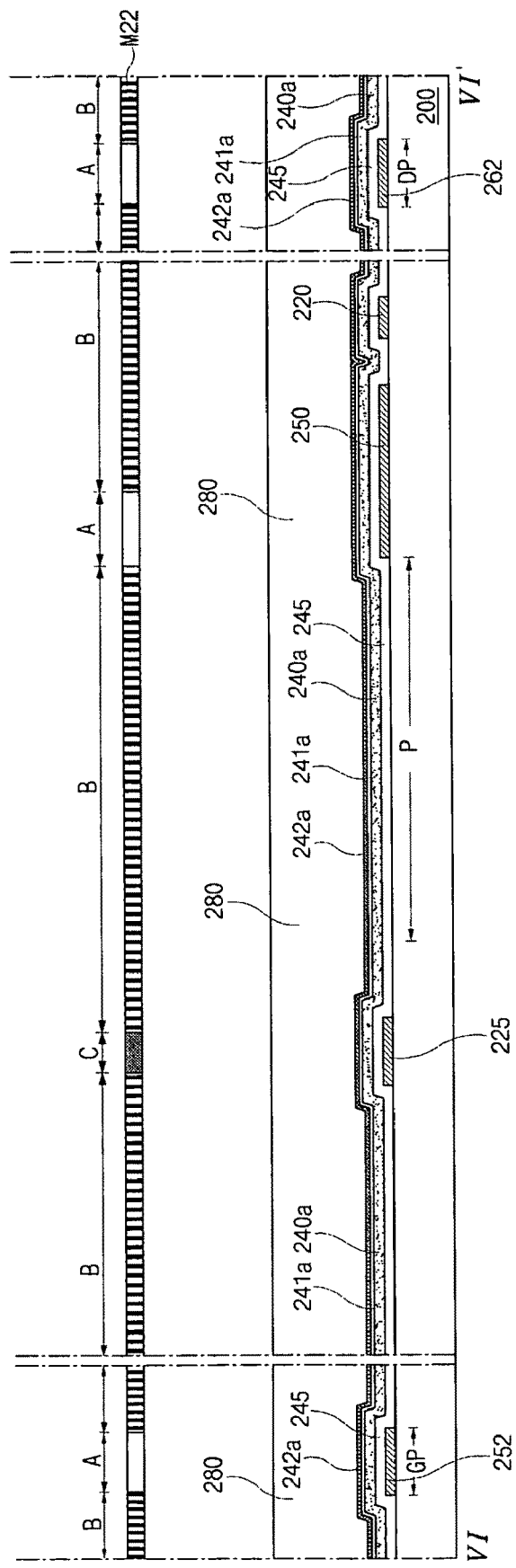
Figure 6D:
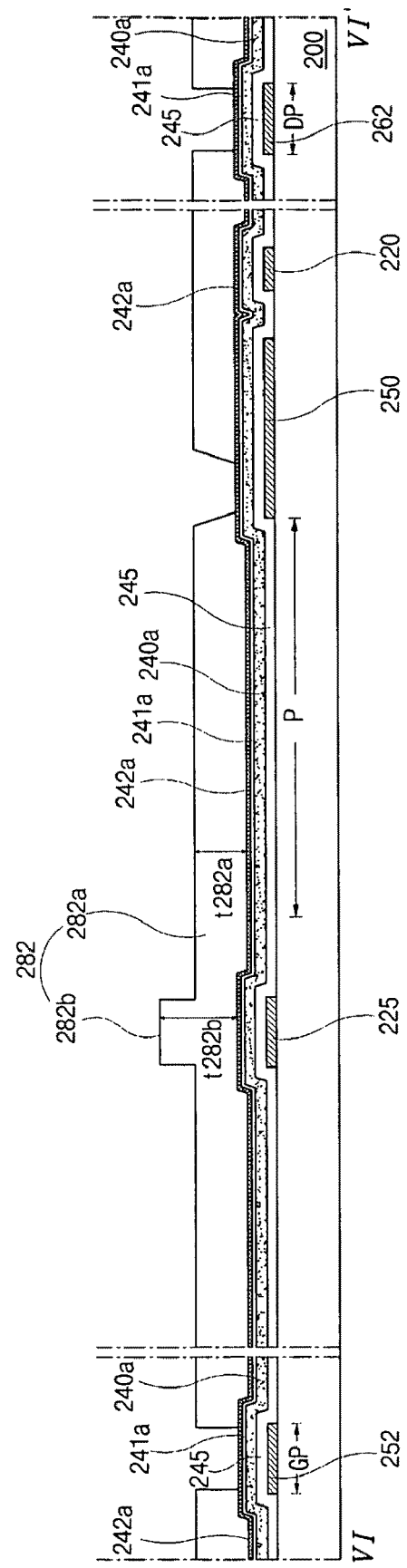
Figure 6E:
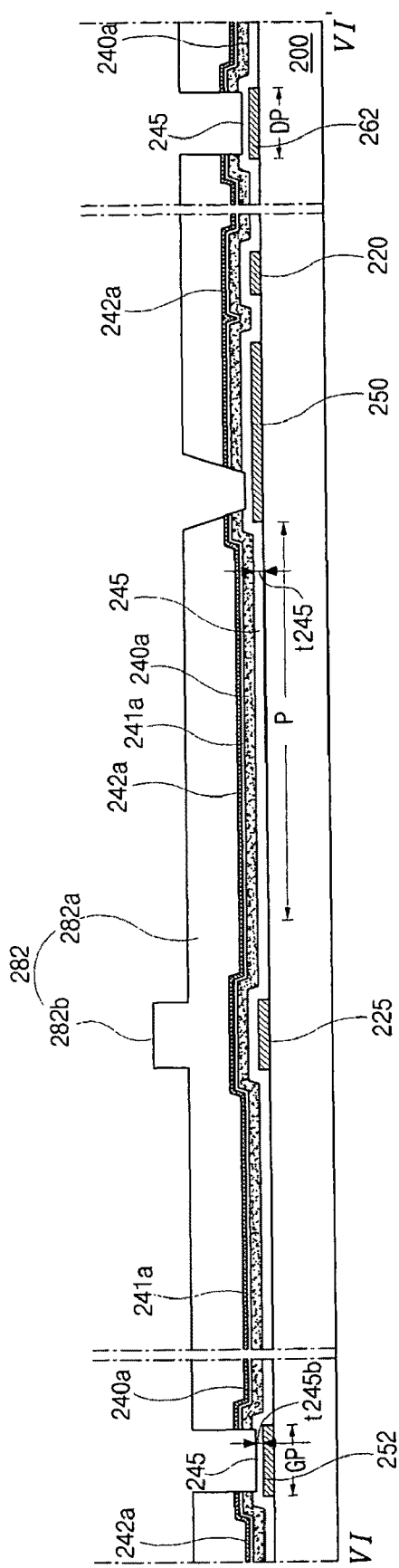
Figure 6F:
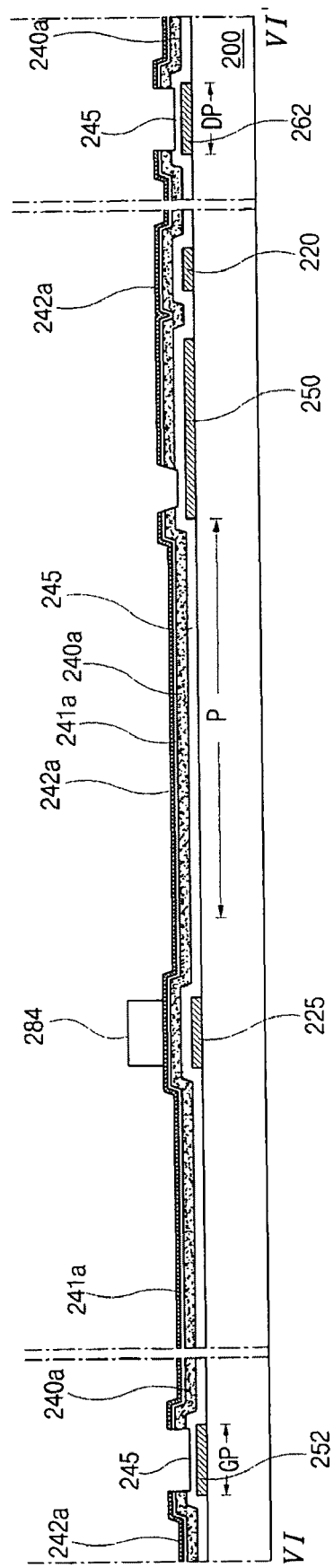
Figure 6G:
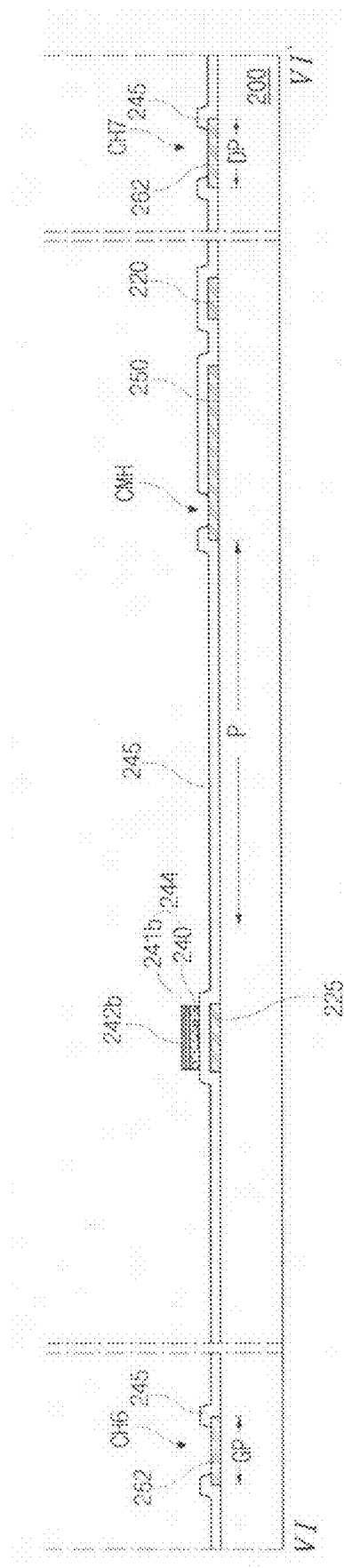
Figure 6H:
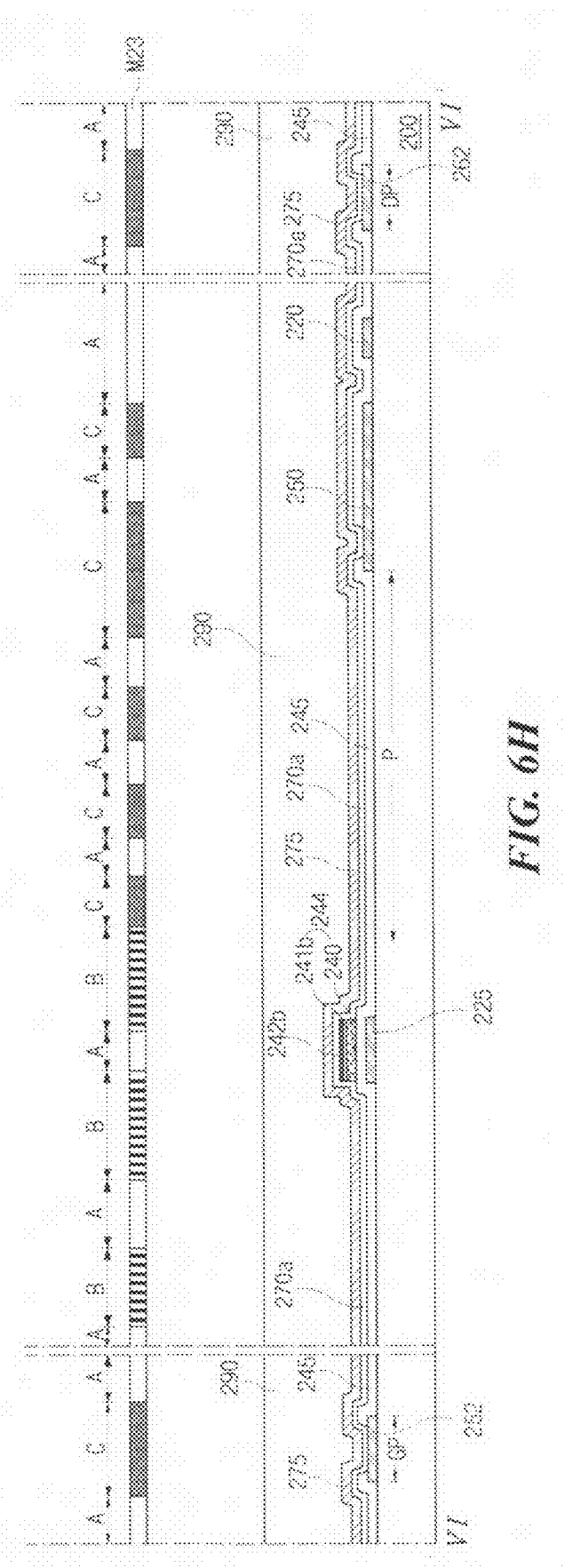
Figure 6I:
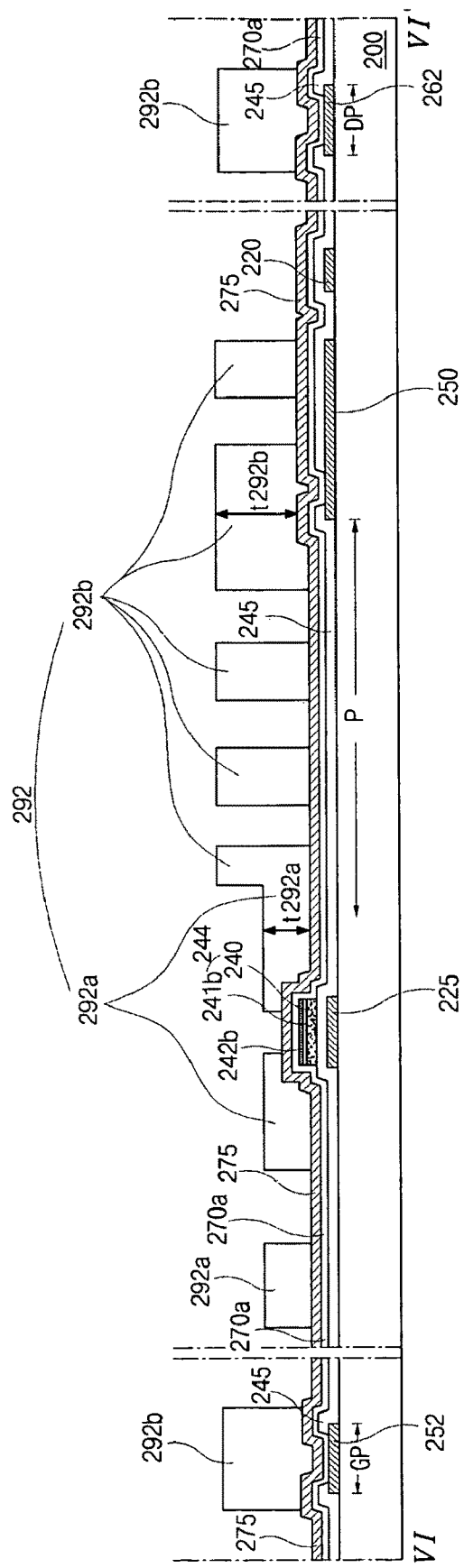
Figure 6J:
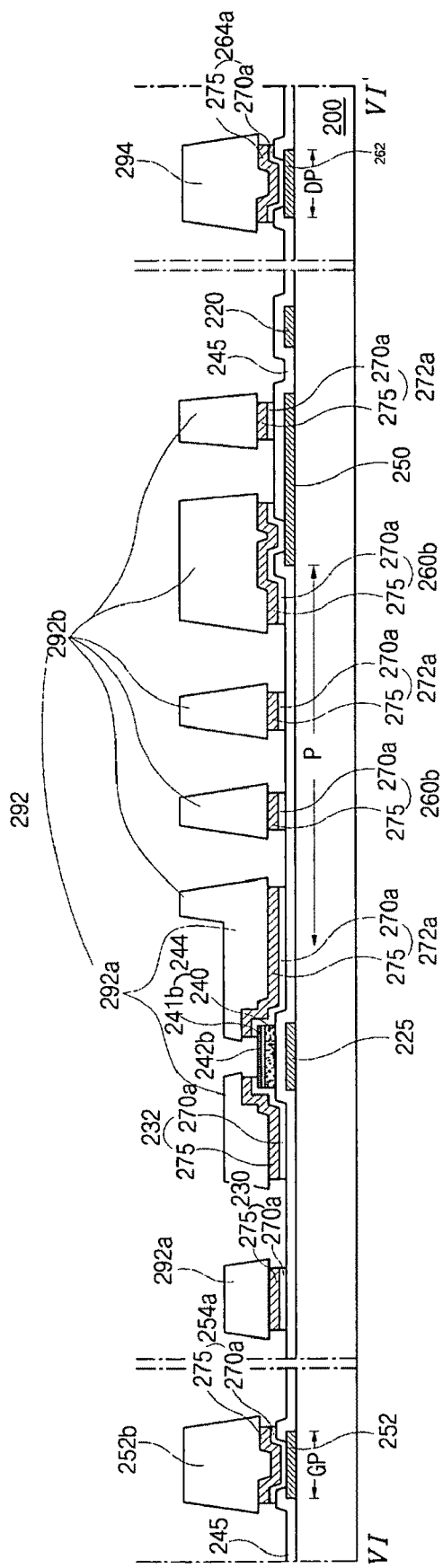
Figure 6K:
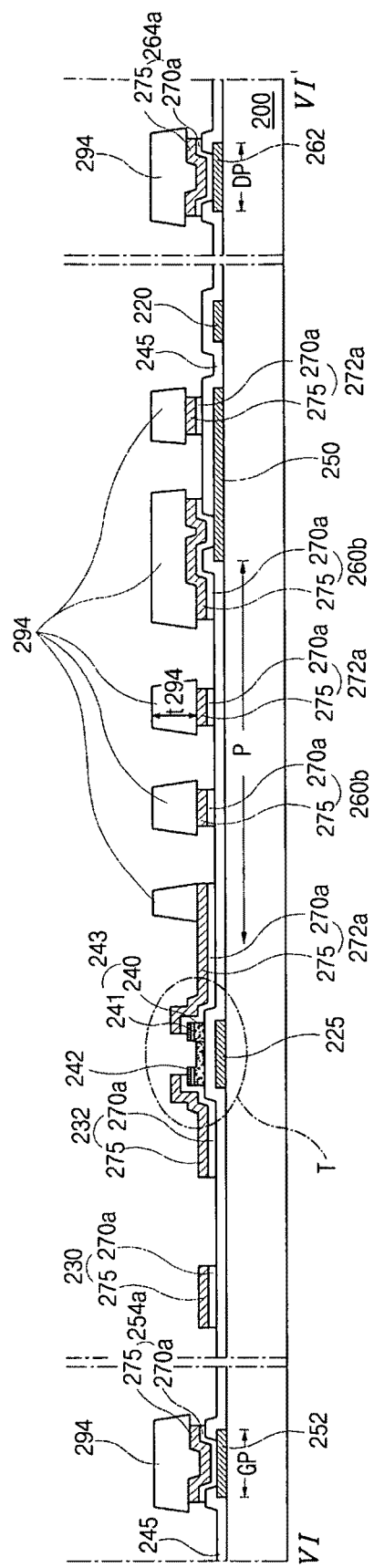
Figure 6L:
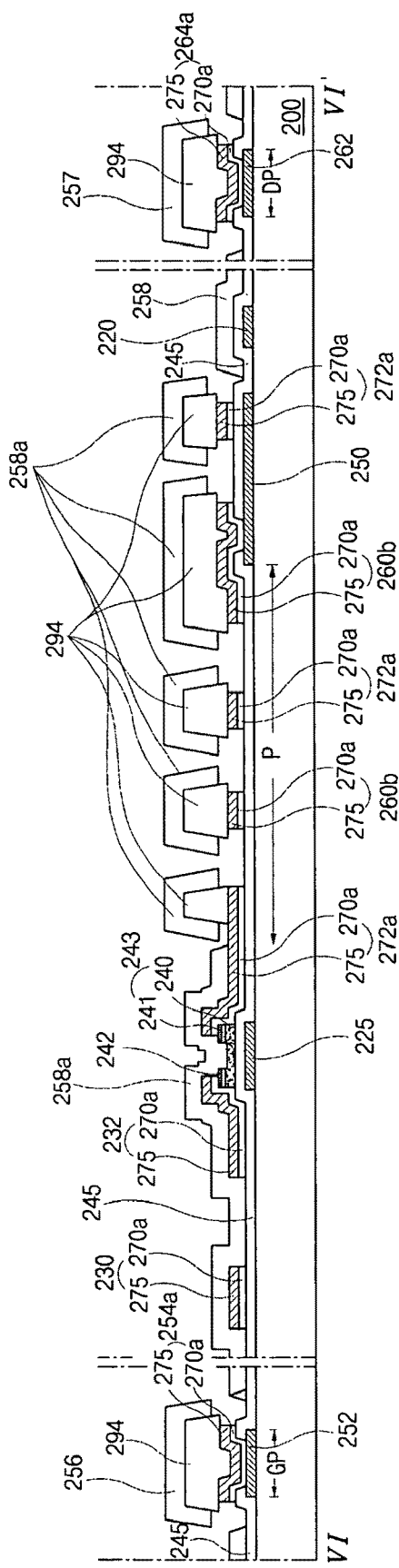
Figure 6M:
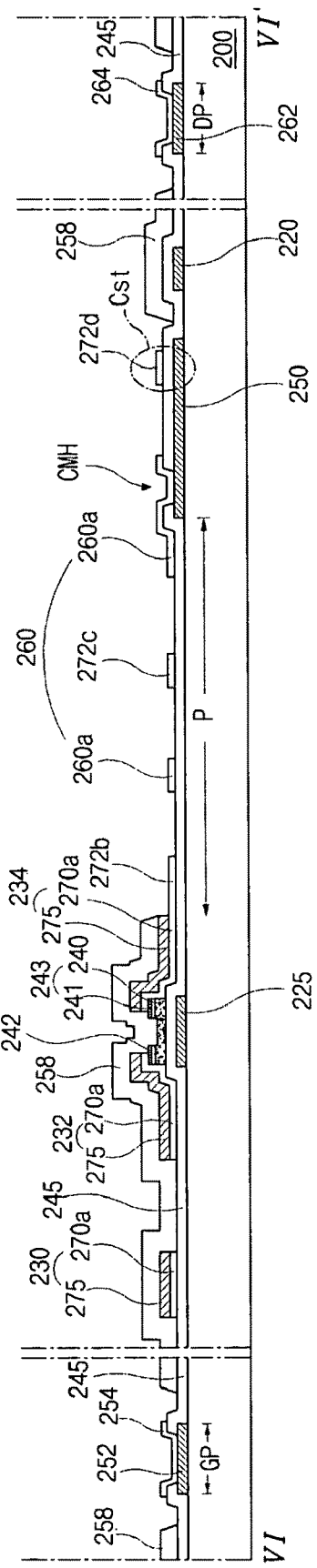

Each of the pixel electrode 272 and the common electrode 260 includes a transparent conductive material layer 270a (of FIG. 6M). Further, the connecting portion 272d of the pixel electrode 272 overlaps the common line 250 to define a storage capacitor Cst including an overlapped portion of the common line 220 as a first capacitor electrode and an overlapped portion of the pixel electrode 272 as a second capacitor electrode.

The array substrate of FIG. 5 is fabricated through a three-mask process, and the semiconductor layer 243 (of FIG. 6L) has an island shape within the gate electrode 225. Moreover, the passivation layer 258a (of FIG. 6L) by a sputtering is patterned using a lift-off process to form a passivation pattern 258. Further, since the pixel electrode and the common electrode have a bar shape in the pixel region, an area for permeation of a stripping solution is enlarged and an excellent result of the lift-off process is obtained.

In FIG. 6A showing a first mask process, a gate line 220, a gate electrode 225, a gate pad 252 and a common line 250 are formed on a substrate 200 having a pixel region P, a gate pad region GP and a data pad region DP by depositing and patterning a conductive metallic material such as copper (Cu), molybdenum (Mo), aluminum (Al), aluminum (Al) alloy or chromium (Cr) using a first mask (not shown). Although not shown in FIG. 6A, the gate electrode 225 extends from the gate line 220 and the gate pad 252 is formed in the gate pad region GP at one end of the gate line 220. The common line is spaced apart from and parallel to the gate line 220. In addition, a data pad 262 having an island shape is formed in the data pad region DP on the substrate 200. The data pad 262 is formed of the same material and in the same layer as the gate line 220. The data pad 262 is disposed to correspond to the data pad region DP at one end of a data line 230 (of FIG. 5) that is formed in a subsequent process. Alternatively, the data pad 162 may be omitted. A gate insulating layer 245 is formed on the gate line 220, the gate electrode 225, the gate pad 252, the common line 250 and the data pad 262. The gate insulating layer 245 includes an inorganic insulating material such as silicon nitride (SiNx) and silicon oxide ($SiO_2$).

FIG. 6B to 6G show a second mask process. In FIG. 6B, an intrinsic silicon layer 240a and a doped silicon layer 241a are sequentially formed on the gate insulating layer 245. The intrinsic silicon layer 240a includes intrinsic amorphous silicon (a-Si:H) and the doped silicon layer 241a includes impurity-doped amorphous silicon layer (n+ a-Si:H). For example, the intrinsic silicon layer 240a and the doped silicon layer 241a may be sequentially formed in the chamber where the gate insulating layer 245 is formed using a chemical vapor deposition (CVD) method. Next, a buffer metallic material layer 242a is formed on the doped silicon layer 241a. The buffer metallic material layer 242a may include molybdenum and have a thickness of about 50 Å.

In FIG. 6C, a first photoresist (PR) layer 280 is formed on the buffer metallic material layer 242a, and a second mask M22 is disposed over the first PR layer 280. The second mask M22 has a transmissive area A, a half-transmissive area B and a blocking area C. Transmittance of the half-transmissive area B is smaller than transmittance of the transmissive area A and greater than transmittance of the blocking area C. The transmittance of the half-transmissive area B may be obtained by forming a half-transmissive film or forming an opaque slit pattern on a quartz plate. Accordingly, when the first PR layer 280 is exposed to light through the second mask M22, areas of the first PR layer 280 directly underneath the half-transmissive area B are incompletely exposed. In addition, areas of first PR layer 280 directly underneath the transmissive area A are completely exposed and areas of the first PR layer 280 directly underneath the blocking area C is not exposed. The blocking area C is disposed to correspond to a region having a thin film transistor (TFT) T (of FIG. 5) formed in a subsequent process, and the transmissive area A is disposed to correspond to the gate pad region GP and the data pad region DP. The half-transmissive area B is disposed to correspond to the other regions of the substrate 200.

In FIG. 6D, after the first PR layer 280 (of FIG. 6C) is exposed through the second mask M22 (of FIG. 6C), the exposed first PR layer 280 is developed to form a first PR pattern 282. The first PR pattern 282 has a first portion 282a corresponding to the half-transmissive area B of the second mask M22 and a second portion 282b corresponding to the blocking area C of the second mask M22. Accordingly, the first portion 282a has thickness t282a smaller than the thickness t282b of the second portion 282b. The first PR layer 280 corresponding to the transmissive area A of the second mask M22 is completely removed to expose the buffer metallic material layer 242a.

In FIG. 6E, the buffer metallic material layer 242a, the doped silicon layer 241a, the intrinsic silicon layer 240a and the gate insulating layer 245 are sequentially patterned using the first PR pattern 282 as an etch mask. Here, the gate insulating layer 245 corresponding to the common line 250, the gate pad 252 in the gate pad region GP and the data pad 262 in the data pad region DP is partially removed so that a portion of the gate insulating layer 245 can remain. For example, the remaining gate insulating layer 245 may have a thickness t245b less than a half of a thickness t245 of the un-patterned gate insulating layer 245. Since the gate insulating layer 245 is partially removed, a subsequent pad opening step for the common line 250, the gate pad 252 and the data pad 262 may be stably performed. An etch rate of a material for the gate insulating layer 245, for example, silicon nitride (SiNx) or silicon oxide ($SiO_2$) is lower than an etch rate of a material for the doped silicon layer 241a and the intrinsic silicon layer 240a. Accordingly, when the gate insulating layer 245 is not removed, the common line 250, the gate pad 252 and the data pad 262 may not be exposed through the gate insulating layer 245 in the subsequent pad opening step. In addition, when the gate insulating layer 245 is completely removed, the common line 250, the gate pad 252 and the data pad 262 may be deteriorated in the subsequent pad opening step.

In FIG. 6F, the first PR pattern 282 (of FIG. 6E) is partially removed by an ashing. As a result, the first portion 282a (of FIG. 6E) of the first PR pattern 282 is completely removed to expose the buffer metallic material layer 242a, and the second portion 282b of the first PR pattern 282 remains to form a second PR pattern 284 having a reduced thickness.

In FIG. 6G, the buffer metallic material layer 242a, the doped silicon layer 241a and the intrinsic silicon layer 240a of FIG. 6F are patterned using the second PR pattern 284 as an etch mask to form a semiconductor pattern 244 and a buffer metal pattern 242b over the gate electrode 225. The semiconductor pattern 244 has an island shape and includes an active layer 240 of intrinsic amorphous silicon and, an ohmic contact pattern 241b of impurity-doped amorphous silicon. While the doped silicon layer 241a and the intrinsic silicon layer 240a are patterned, the remaining gate insulating layer 245 corresponding to the common line 250, the gate pad 252 in the gate pad region GP and the data pad 262 in the data pad region DP is completely removed to form a common contact hole CMH exposing the common line 250, a gate pad contact hole CH6 exposing the gate pad 252 and a data pad contact hole CH7 exposing the data pad 262.

In the second embodiment of the present invention, since the active layer 240 of the semiconductor pattern 244 formed during the second mask process has an island shape within the gate electrode 225, exposure of the active layer 240 to a backlight unit is prevented and deterioration of the TFT T is also prevented. As a result, display quality of an LCD device is improved. In addition, since the active layer 240 of the semiconductor pattern 244 has an island shape within the gate electrode 225, an area for a black matrix (not shown) preventing light leakage is reduced. Moreover, since the data line, the source electrode and the drain electrode are formed directly on the substrate without a protruded semiconductor layer therebetween, the area for the black matrix is further reduced, and deterioration such as wavy noise due to interference between the protruded semiconductor layer and the pixel electrode is prevented.

Next, the second PR pattern 284 (of FIG. 6F) is removed through a stripping step, thereby the second mask process is finished. FIGS. 6H to 6M show a third mask process. In FIG. 6H, a transparent conductive material layer 270a and an opaque conductive material layer 275 are sequentially formed on the buffer metal pattern 242b and the gate insulating layer 245. For example, the transparent conductive material layer 270a may include one of indium-tin-oxide (ITO) and indium-zinc-oxide (IZO). In addition, the opaque conductive material layer 275 may include at least one of copper (Cu), molybdenum (Mo), molybdenum alloy (Mo) such as molybdenum titanium (MoTi), aluminum (Al), aluminum (Al) alloy such as aluminum neodymium (AlNd) and chromium (Cr). Next, a second PR layer 290 is formed on the opaque conductive material layer 275 and a third mask M23 is disposed over the second PR layer 290. The third mask M23 has a transmissive area A, a half-transmissive area B and a blocking area C. Transmittance of the half-transmissive area B is smaller than transmittance of the transmissive area A and greater than transmittance of the blocking area C. The transmittance of the half-transmissive area B may be obtained by forming a half-transmissive film or forming an opaque slit pattern on a quartz plate. Accordingly, when the second PR layer 290 is exposed to light through the third mask M23, the second PR layer 290 corresponding to the half-transmissive area B is incompletely exposed. In addition, the second PR layer 290 corresponding to the transmissive area A is completely exposed and the second PR layer 290 corresponding to the blocking area C is not exposed.

The transmissive area A and the blocking area C are alternately disposed in the pixel region P. In addition, the blocking area C is disposed to correspond to the gate pad region GP and the data pad region DP, and the half-transmissive are B is disposed to correspond to boundary regions of the buffer metal pattern 242b, boundary regions of the common line 250 and the data line 230 (of FIG. 5) formed in a subsequent process. The transmissive area A is disposed to correspond to a central region of the buffer metal pattern 142b, a central region of the common line 250 and the other regions of the substrate 100.

In FIG. 6I, after the second PR layer 290 (of FIG. 6H) is exposed through the third mask M23 (of FIG. 6H), the exposed second PR layer 290 is developed to obtain a third PR pattern 292. The third PR pattern 292 has a first portion 292a corresponding to the half-transmissive area B of the third mask M23 and a second portion 292b corresponding to the blocking area C of the third mask M23. Accordingly, the first portion 292a has thickness t292a that is smaller than the thickness t292b of the second portion 292b. The second PR layer 290 corresponding to the transmissive area A of the third mask M23 is completely removed to expose the opaque conductive material layer 275.

In FIG. 6J, the opaque conductive material layer 275 and the transparent conductive material layer 270a are sequentially patterned using the third PR pattern 292 as an etch mask to form a data line 230, a source electrode 232, a drain electrode 234, a pixel electrode pattern 272a, a common electrode pattern 260b, a gate pad terminal pattern 254a and a data pad terminal pattern 264a. For example, the opaque conductive material layer 275 and the transparent conductive material layer 270a may be patterned through a wet etching method having an isotropic property. Accordingly, the opaque conductive material layer 275 and the transparent conductive material layer 270a may be over-etched to form an undercut shape such that sides of the patterned opaque conductive material layer 275 and the patterned transparent conductive material layer 270a are disposed inside sides of the third PR pattern 292. As a result, a bottom surface of side portions of the third PR pattern 292 is exposed. During a subsequent lift-off process, where a passivation layer is formed on a PR pattern and then the passivation layer and the PR pattern are removed together, a stripping solution may easily permeate through the exposed bottom surface of the PR pattern.

Each of the data line 230, the source electrode 232, the drain electrode 234, the pixel electrode pattern 272a, the common electrode pattern 260b, the gate pad terminal pattern 254a and the data pad terminal pattern 264a has a double-layered structure of the opaque conductive material layer 275 and the transparent conductive material layer 270a. The source and drain electrodes 232 and 234 are disposed at both sides of the buffer metal pattern 242b, and the pixel electrode pattern 272a alternates with the common electrode pattern 260b in the pixel region P. The gate pad terminal pattern 254a and the data pad terminal pattern 264a contact the gate pad 252 and the data pad 262, respectively. Each of the data line 230, the source electrode 232, the drain electrode 234, the pixel electrode pattern 272a, the common electrode pattern 260a, the gate pad terminal pattern 254a and the data pad terminal pattern 264a defines an undercut shape with the third PR pattern 292, and the bottom surface of the side portions of the third PR pattern 292 is exposed.

In FIG. 6K, the buffer metal pattern 242b (of FIG. 6J) and the ohmic contact pattern 241b (of FIG. 6J) are patterned using the third PR pattern 292 (of FIG. 6J) as an etch mask. Accordingly, a buffer metal layer 242 and an ohmic contact layer 241 are formed at both sides of the active layer 240, and the active layer 240 is exposed to define a channel region ch as a current path of a TFT T. The active layer 240 and the ohmic contact layer 241 constitute a semiconductor layer 243, and the gate electrode 225, the semiconductor layer 243, the source electrode 232 and the drain electrode 234 constitute the TFT T. The buffer metal layer 242 reduces contact resistance and work function difference between the transparent conductive material layer 270a of the source and drain electrodes 232 and 234 and the ohmic contact layer 241 so that an ohmic contact can be obtained and an electric property of the TFT T can be improved. Next, the third PR pattern 292 is partially removed by an ashing. As a result, the first portion 292a of the third PR pattern 292 is completely removed to expose the data line 230, the source electrode 232 and the drain electrode 234, and the second portion 292b of the third PR pattern 292 remains to form a fourth PR pattern 294 having a reduced thickness. As a result, the fourth PR pattern 294 is formed on the pixel electrode pattern 272a, the common electrode pattern 260b, the gate pad terminal pattern 254a and the data pad terminal pattern 264a.

In FIG. 6L, a passivation layer 258a is formed on the fourth PR pattern 294, the data line 230, the source electrode 232 and the drain electrode 234. The passivation layer 258a includes one of inorganic insulating material such as silicon nitride (SiNx) and silicon oxide (SiO$_2$). In addition, the passivation layer 258a is formed through a physical vapor deposition (PVD) method, for example, a sputtering method.

A passivation layer through a chemical vapor deposition (CVD) method has disadvantages. Since the CVD method requires a temperature over about 350° C., the fourth PR pattern 294 of an organic material having a thermal resistance of about 150° C. may deform or lose its shape while the passivation layer is formed through the CVD method. The step height t294 (of FIG. 6K) of the fourth PR pattern 294 may be reduced or the step of the fourth PR pattern 294 becomes warped or deformed. Accordingly, the passivation layer through the CVD method may cover the entire surface of the substrate 200 without break, and the stripping solution for the fourth PR pattern 294 may not permeate through the passivation layer during a subsequent lift-off process. As a result, the passivation layer through the CVD method may leave undesired residues of the fourth PR pattern 294 and the passivation layer during the subsequent lift-off process. Moreover, the undesired residues of the fourth PR pattern 294 may react with liquid crystal materials in a subsequent process to reduce display quality of the LCD device.

To solve the above problems of the passivation layer through a CVD method, the passivation layer 258a of the second embodiment of the present invention is formed through a sputtering method. Since the passivation layer 258a through the sputtering method is formed in a temperature lower than about 150° C., the fourth PR pattern 294 is not deformed and does not lose its shape. In addition, the passivation layer 258a through the sputtering method may be applied to a substrate including a flexible material such as plastic. Since the height and the shape of the fourth PR pattern 294 are not changed, the passivation layer 258a does not cover the entire surface of the substrate 200 without break. Instead, the passivation layer 258a has breaks at boundaries of the fourth PR pattern 294 due to the increased step height. As a result, a portion of the passivation layer 258a on the fourth PR pattern 294 is not connected to and is separated from the other portion of the passivation layer 258a.

In FIG. 6M, the stripping solution is applied to the substrate 200 having the passivation layer 258a (of FIG. 6L). For example, the stripping solution may include a stripper for a photoresist material. The stripping solution permeates through the bottom surface of the fourth PR pattern 294, and the portion of the passivation layer 258a on the fourth PR pattern 294 is removed together with the fourth PR pattern 294. As a result, the other portion of the passivation layer 258a remains to form a passivation pattern 258, and the pixel electrode pattern 272a, the common electrode pattern 260b, the gate pad terminal pattern 254a and the data pad terminal pattern 264a are exposed after the lift-off process. Next, the opaque conductive material layer 275 of the pixel electrode pattern 272a, the common electrode pattern 260b, the gate pad terminal pattern 254a and the data pad terminal pattern 264a is removed using the passivation pattern 258 as an etch mask to form a pixel electrode 272, a common electrode 260, a gate pad terminal 254 and a data pad terminal 264.

The pixel electrode 272 includes an extending portion 272b, a plurality of vertical portions 272c each having a bar shape and a connecting portion 272d. The extending portion 272b extends from the transparent conductive material layer 270a of the drain electrode 234, and the plurality of vertical portions 272c vertically extend from the extending portion 272b. The connecting portion 272d connects the plurality of vertical portions 272c. Further, a common electrode 260 including a plurality of vertical portions 260a is formed in the pixel region P. Each of the plurality of vertical portions 260a has a bar shape. The plurality of vertical portions 260a of the common electrode 260 are connected to the common line 250 through a common contact hole CMH. The plurality of vertical portions 260a of the common electrodes 260 alternate with the plurality of vertical portions 272c of the pixel electrode 272 in the pixel region P.

Accordingly, in the array substrate of the second embodiment of the present invention fabricated through a three-mask process, since the data line 230, the source electrode 232 and the drain electrode 234 are covered with the passivation pattern 258, deterioration due to particles is prevented and reliability of the LCD device is improved. In addition, each of the data line 230, the source electrode 232 and the drain electrode 234 includes the opaque conductive material layer 275 and the transparent conductive material layer 270a, while each of the pixel electrode 272, the common electrode 260, the gate pad terminal 254 and the data pad terminal 264 includes the transparent conductive material layer 270a.

The connecting portion 272d of the pixel electrode 272 overlaps the common line 250 to define a storage capacitor Cst including the overlapped portion of the common line 250 as a first capacitor electrode, the overlapped portion of the connecting portion 272d of the pixel electrode 272 as a second capacitor electrode and the gate insulating layer 245 as a dielectric layer. Since only the gate insulating layer 245 relatively thin is used as a dielectric layer, a capacitance of the storage capacitor Cst is maximized and an area for the storage capacitor Cst is minimized.

In the array substrate according to the second embodiment of the present invention, since the semiconductor layer of the TFT has an island shape within the gate electrode, electric property of the TFT is improved and aperture ratio increases. In addition, since the data line, the source electrode and the drain electrode are covered with the passivation pattern, reliability of the LCD device is improved. Further, since the passivation pattern is formed through the sputtering method, degradation in the lift-off process is minimized. Moreover, since the pixel electrode and the common electrode are alternately formed to have a bar shape in the pixel region, a stripping solution easily permeates and a lift-off process is further improved.

Figure 7:
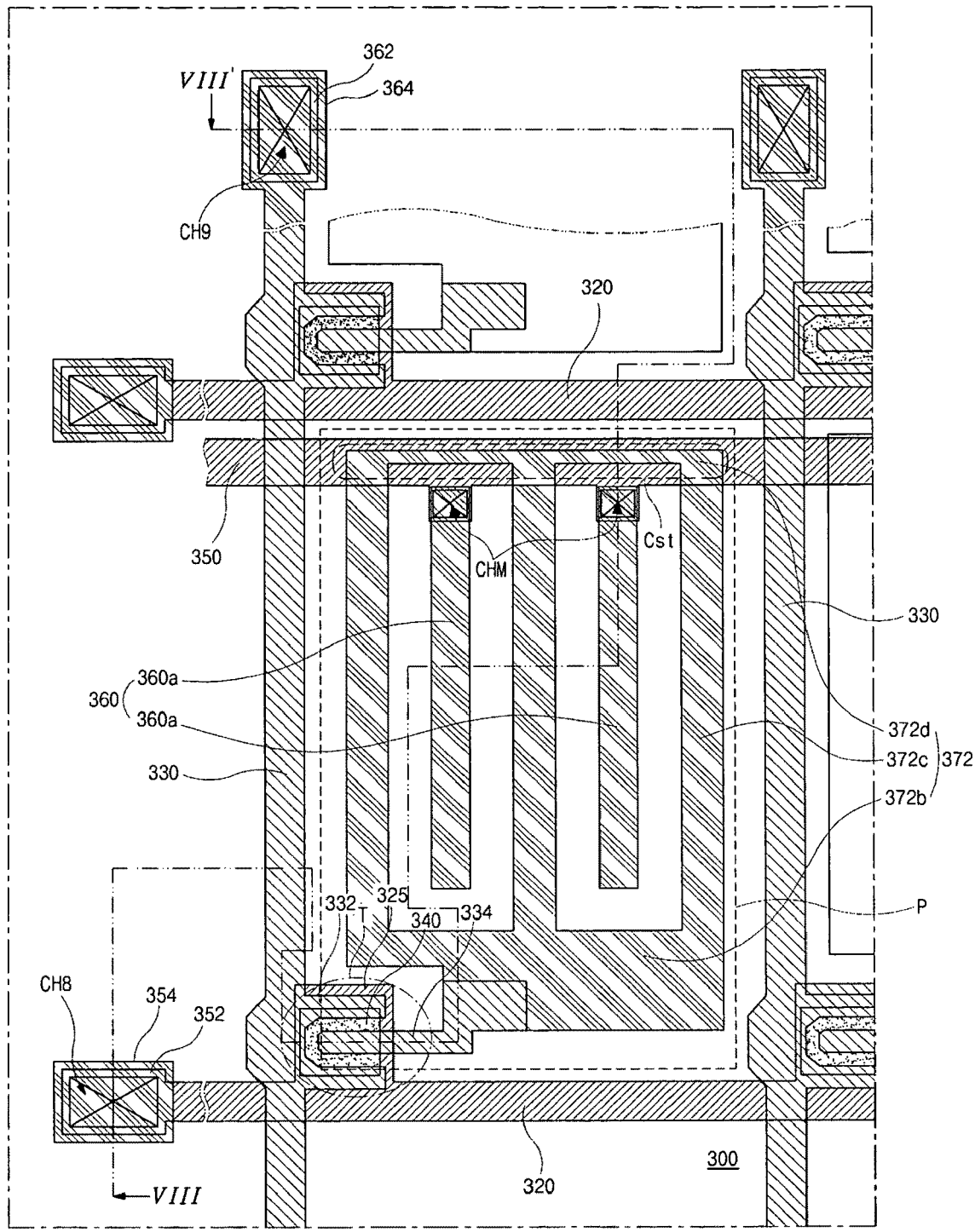
FIG. 7 is a schematic top view showing an array substrate for a liquid crystal display device according to a third embodiment of the present invention.
Figure 8:
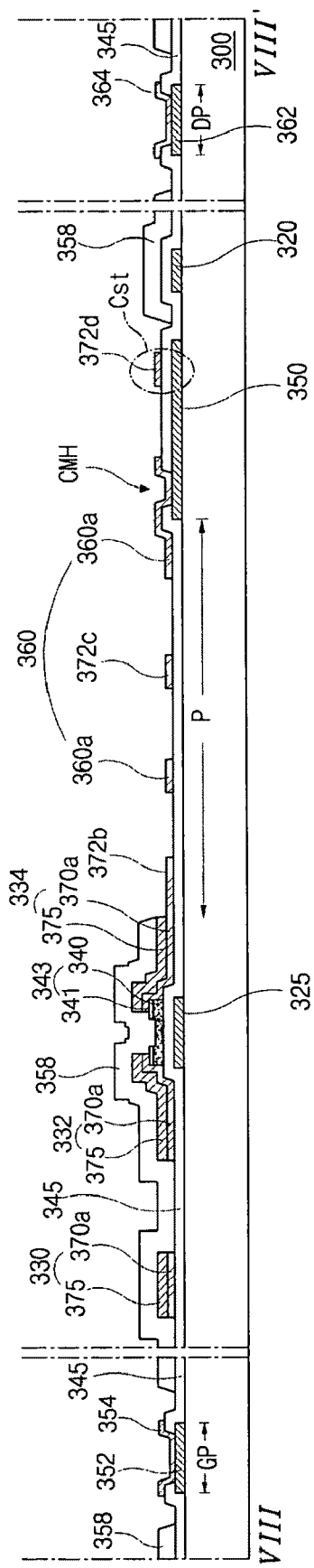
FIG. 8 is a schematic cross-sectional view taken along a line VIII-VIII' of FIG. 7.

FIG. 7 is a schematic top view showing an array substrate for a liquid crystal display device according to a third embodiment of the present invention, and FIG. 8 is a schematic cross-sectional view taken along a line VIII-VIII of FIG. 7. In the array substrate according to the third embodiment of the present invention, since common electrodes and pixel electrodes alternate with each other in a pixel region, a lift-off process is performed more effectively. In addition, since each of the common electrode and the pixel electrode has a single-layered structure of an opaque conductive material, contrast ratio is further improved.

In FIGS. 7 and 8, a gate line 320, a gate electrode 325, a gate pad 352 and a common line 350 are formed on a substrate 300. The gate electrode 325 extends from the gate line 320 and the gate pad 352 is formed at one end of the gate line 320. The common line 350 is parallel to and spaced apart from the gate line 320. Further, a data line 330, a source electrode 332, a drain electrode 334 and a data pad 362 are formed on the substrate 200. The data line 330 crosses the gate line 320 to define a pixel region P. The source electrode 332 extends from the data line 330 and the drain electrode 334 is spaced apart from the source electrode 332. The source electrode 332 has a U shape and the drain electrode 334 has a bar shape corresponding to the U shape. Each of the data line 330, the source electrode 332 and the drain electrode 334 includes a double-layered structure having a first opaque conductive material layer 370a and a second opaque conductive material layer 375. The first opaque conductive material layer 370a includes one of molybdenum (Mo) and molybdenum alloy such as molybdenum titanium (MoTi), while the second opaque conductive material layer 375 includes one of copper (Cu), aluminum (Al), aluminum (Al) alloy such as aluminum neodymium (AlNd) and chromium (Cr).

The data pad 362 is formed at one end of the data line 330. The gate pad 352 is formed of the same material and in the same layer as the data pad 362. A gate pad terminal 354 on the gate pad 352 is connected to the gate pad 352 through a gate pad contact hole CH8, and a data pad terminal 364 on the data pad 362 is connected to the data pad 362 through a data pad contact hole CH9. The gate pad terminal 354 and the data pad terminal 364 include the first opaque conductive material layer 370a.

A thin film transistor (TFT) T is connected to the gate line 320 and the data line 330. The TFT T includes the gate electrode 325, a semiconductor layer 343, the source electrode 332 and the drain electrode 334. The semiconductor layer 343 is formed over the gate electrode 325, and the source and drain electrodes 332 and 334 contact the semiconductor layer 343. The semiconductor layer 343 includes an active layer 340 of intrinsic amorphous silicon (a-Si:H) and an ohmic contact layer 341 of an impurity-doped amorphous silicon (n+ a-Si:H). Since the semiconductor layer 343 is formed using a mask different from a mask for the data line 330, the data pad 362, the source electrode 332 and the drain electrode 334, the semiconductor layer 343 has an island shape and is disposed within the gate electrode 325. As a result, the semiconductor layer 343 of the TFT T is not exposed to light from a backlight unit (not shown) and a photocurrent is not generated in the TFT T. Therefore, degradation of the TFT T due to the photocurrent is prevented.

Since the first opaque conductive material layer 370a is formed under the second opaque conductive material layer 375 in the double-layered structure of the source and drain electrodes 332 and 334, the first opaque conductive material layer 370a may directly contact the ohmic contact layer 341. Since the first opaque conductive material layer 370a does not have a work function much higher than the ohmic contact layer 341 such that the work function difference between the ohmic contact layer 341 and the source and drain electrodes 332 and 334 is small. As a result, the TFT T may have a relatively low contact resistance of the source and drain electrodes 332 and 334, and a buffer metal layer between the source and drain electrodes 332 and 334 and the ohmic contact layer 341 may be omitted.

The active layer 340 is exposed between the source and drain electrodes 332 and 334 to define a channel region ch for current flow. A passivation pattern 358 is formed on the data line 330, the source electrode 332 and the drain electrode 334 through a physical vapor deposition (PVD) method such as a sputtering and a lift-off method. A pixel electrode 372 connected to the drain electrode 334 is formed in the pixel region P. The pixel electrode 372 includes an extending portion 372b, a plurality of vertical portions 372c having a bar shape and a connecting portion 372d. The extending portion 372b extends from the drain electrode 334, and the plurality of vertical portions 372c vertically extend from the extending portion 372b. The connecting portion 372d connects the plurality of vertical portions 372c. Further, a common electrode 360 including a plurality of vertical portions 360a is formed in the pixel region P. Each of the plurality of vertical portions 360a has a bar shape. The plurality of vertical portions 360a of the common electrode 360 are connected to the common line 350 through a common contact hole CMH. The plurality of vertical portions 360a of the common electrodes 360 alternate with the plurality of vertical portions 372c of the pixel electrode 372 in the pixel region P.

Here, each of the common electrode 360 and the pixel electrode 372 has a single-layered structure of the first opaque conductive material layer 370a so that a disclination can be reduced. For example, the first opaque conductive material layer 370a of molybdenum titanium (MoTi) may have a thickness of about 300 Å and the second opaque conductive material layer 370b of copper (Cu) may have a thickness of about 2000 Å. The step difference by the total thickness of about 2300 Å may cause a disclination in an LCD device. In an LCD device having an array substrate of FIGS. 7 and 8, however, since the common electrode 360 and the pixel electrode 372 may have a total thickness of about 300 Å corresponding to the first opaque conductive material layer 370a, the step difference by the total thickness is reduced and the disclination due to the step difference is prevented.

The connecting portion 372d of the pixel electrode 372 overlaps the common line 350 to define a storage capacitor Cst including an overlapped portion of the common line 320 as a first capacitor electrode and an overlapped portion of the pixel electrode 372 as a second capacitor electrode.

The array substrate of FIGS. 7 and 8 is fabricated through a three-mask process, and the semiconductor layer 343 has an island shape within the gate electrode 325. Moreover, the passivation layer 358a by a sputtering is patterned using a lift-off process to form a passivation pattern 358. Further, since the pixel electrode and the common electrode have a bar shape in the pixel region, an area for permeation of a stripping solution is enlarged and an excellent result of the lift-off process is obtained. Since each of the pixel electrode 372 and the common electrode 360 has a single-layered structure of the first opaque conductive material layer 370a, disclination and brightness of a black image are reduced and contrast ratio of the LCD device is improved.

Figure 9:
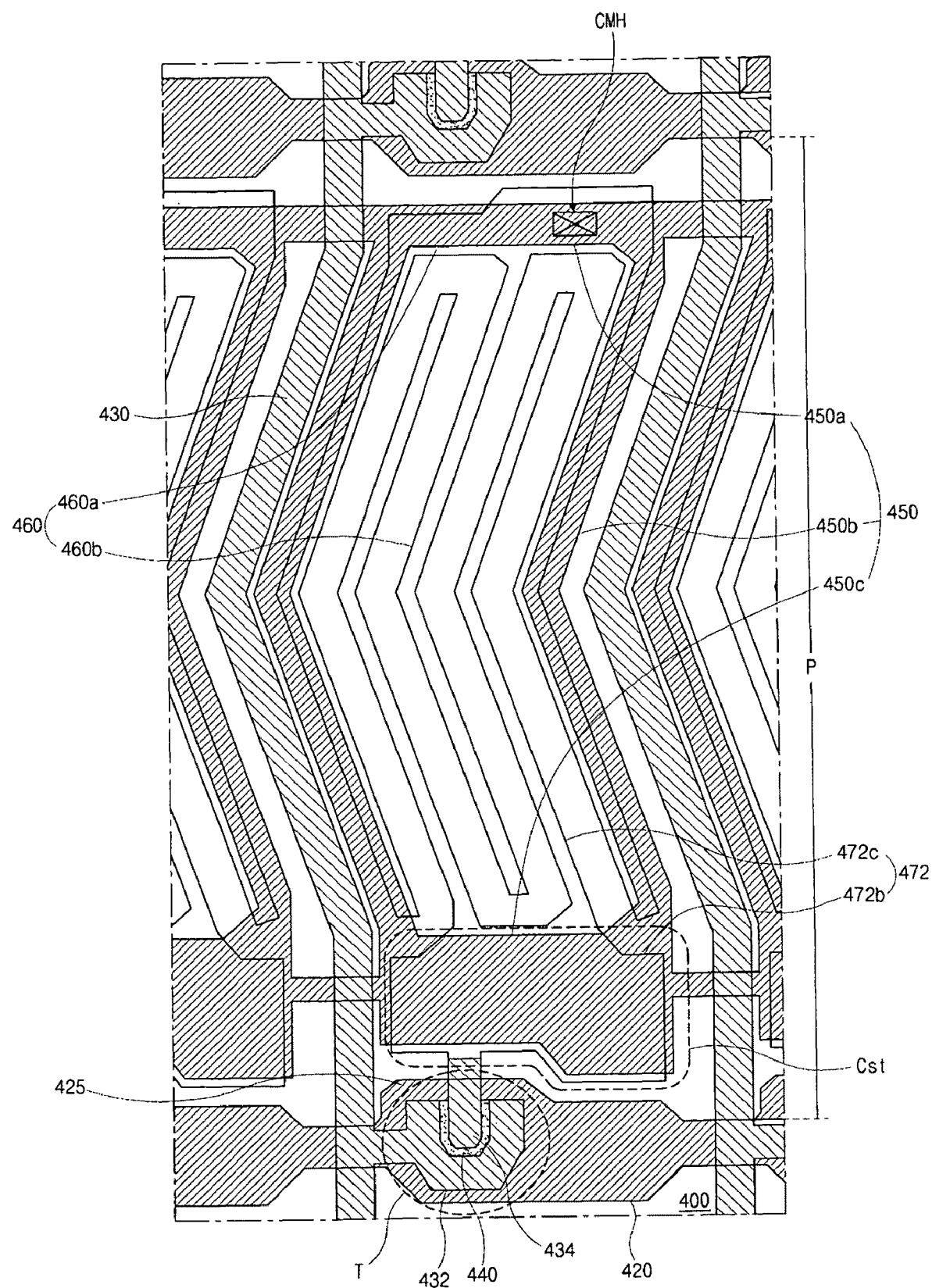
FIG. 9 is a schematic top view showing an array substrate for a liquid crystal display device according to a fourth embodiment of the present invention.

FIG. 9 is a schematic top view showing an array substrate for a liquid crystal display device according to a fourth embodiment of the present invention. In FIG. 9, a gate line 420, a gate electrode 425 and a common line 250 are formed on a substrate 400. The gate line 420 extends along a first direction. The gate electrode 425 may be a part of the gate line 420. The common line 450 is disposed between adjacent gate lines 420. The common line 450 includes first, second and third portions 450a, 450b and 450c. The first portion 450a and the third portion 450c extend along the first direction, and the second portion 450b extends along a second direction perpendicular to the first direction. The first portion 450a and the third portion 450c are parallel to and spaced apart from the gate line 420. The second portion 450b may include two parts, each of which connects the first portion 450a and the third portion 450c. Further, a data line 430, a source electrode 432, and a drain electrode 434 are formed on the substrate 400. The data line 430 extends along the second direction and crosses the gate line 420 to define a pixel region P. The source electrode 432 extends from the data line 430 and the drain electrode 434 is spaced apart from the source electrode 432. The source electrode 432 has a U shape and the drain electrode 434 has a bar shape corresponding to the U shape. As stated in the previous embodiments, each of the data line 430, the source electrode 432 and the drain electrode 434 includes a double-layered structure having a transparent conductive material layer (not shown) and an opaque conductive material layer (not shown).

A thin film transistor (TFT) T is connected to the gate line 420 and the data line 430. The TFT T includes the gate electrode 425, a semiconductor layer, the source electrode 432 and the drain electrode 434. The semiconductor layer is formed over the gate electrode 425, and the source and drain electrodes 432 and 434 contact the semiconductor layer. The semiconductor layer includes an active layer 440 of intrinsic amorphous silicon (a-Si:H) and an ohmic contact layer (not shown) of an impurity-doped amorphous silicon (n+ a-Si:H). Since the semiconductor layer is formed using a mask different from a mask for the data line 430, the source electrode 432 and the drain electrode 434, the semiconductor layer has an island shape, and its boundary is disposed within the gate electrode 425. As a result, the semiconductor layer of the TFT T is not exposed to light from a backlight unit (not shown) and a photocurrent is not generated in the TFT T. Therefore, degradation in electric property of the TFT T due to the photocurrent is prevented. Although not shown in the figure, a buffer metal layer may is further formed between the ohmic contact layer and each of the source and drain electrodes 432 and 434 to reduce contact resistance so as to obtain an ohmic contact.

The active layer 440 is exposed between the source and drain electrodes 432 and 434 to define a channel region for current flow. Although not shown in the figure, a passivation layer is formed through a physical vapor deposition (PVD) method such as a sputtering and patterned using a lift-off method to form a passivation pattern on the data line 430, the source electrode 432 and the drain electrode 434.

A pixel electrode 472 connected to the drain electrode 434 is formed in the pixel region P. The pixel electrode 472 includes an extending portion 472b and a plurality of vertical portions 472c having a bar shape. The extending portion 472b extends from the drain electrode 434, and the plurality of vertical portions 472c extend from the extending portion 472b along the second direction. The extending portion 472b overlaps the third portion 450c of the common line 450 to form a storage capacitor Cst. Further, a common electrode 460 is formed in the pixel region P. The common electrode 460 includes a connecting portion 460a and a plurality of vertical portions 460a. The connecting portion 460a overlaps the first portion 450a of the common line 450. The connecting portion 460a is connected to the first portion 450a of the common line 450 through a common contact hole CMH. The plurality of vertical portions 460b extend from the connecting portion 460a along the second direction. Each of the plurality of vertical portions 460b has a bar shape. The plurality of vertical portions 460b of the common electrode 460 alternate with the plurality of vertical portions 472c of the pixel electrode 472 in the pixel region P.

Each of the pixel electrode 472 and the common electrode 460 includes a transparent conductive material layer. The vertical portions 460b of the common electrode 460, the vertical portions 472c of the pixel electrode 472, the second portion 450b of the common line 450, and the data line 430 are bent substantially at the middle of the pixel region P to form multi-domains.

The array substrate of FIG. 9 is fabricated through a three-mask process similar to the previous embodiments, and the semiconductor layer has an island shape within the gate electrode 425. Moreover, the passivation layer by a sputtering is patterned using a lift-off process to form a passivation pattern. Further, since the pixel electrode and the common electrode have a bar shape in the pixel region, an area for permeation of a stripping solution is enlarged and an excellent result of the lift-off process is obtained.

It will be apparent to those skilled in the art that various modifications and variations can be made in a driving circuit for a liquid crystal display device and a method of driving the same of the present invention without departing from the spirit or scope of the invention. Thus, it is intended that embodiments of the invention cover the modifications and variations of this invention provided they come within the scope of the appended claims and their equivalents.

What is claimed is:

1. A method of fabricating an array substrate for a liquid crystal display device, comprising:
    forming a gate line, a gate electrode connected to the gate line, a gate pad at one end of the gate line on a substrate through a first mask process;
    forming a gate insulating layer on the gate line, the gate electrode, and the gate pad;
    forming a semiconductor layer on the gate insulating layer through a second mask process, the boundary of the semiconductor layer is within the gate electrode; and
    forming a data line crossing the gate line, a source electrode connected to the data line, a drain electrode spaced apart from the source electrode, a pixel electrode extending from the drain electrode, a gate pad terminal contacting the gate pad and a data pad terminal connected to the data line and forming a passivation pattern on the data line, the source electrode and the drain electrode through a third mask process, wherein each of the data line, the source electrode and the drain electrode has a double-layered structure of a transparent conductive material layer and an opaque conductive material layer on the transparent conductive material layer, wherein the transparent conductive material layer in the source electrode and the drain electrode is disposed between the opaque conductive material layer and the semiconductor layer.

2. The method according to claim 1, wherein the first mask process further comprises forming a data pad on the substrate, the second mask process further comprises forming a data pad contact hole in the gate insulating layer, the data pad terminal contacting the data pad through the data pad contact hole.

3. The method according to claim 1, wherein the second mask process further comprises:
    sequentially forming an intrinsic silicon layer and a doped silicon layer on the gate insulating layer;
    forming a first photoresist pattern on the doped silicon layer, the first photoresist pattern having a first portion and a second portion having a thickness greater than the thickness of the first portion, the gate insulating layer corresponding to the gate pad and the data pad exposed through the first photoresist pattern;
    patterning the doped silicon layer and the intrinsic silicon layer using the first photoresist pattern as an etch mask;
    partially removing the first photoresist pattern to form a second photoresist pattern corresponding to the gate electrode; and
    patterning the doped silicon layer, the intrinsic silicon layer and the gate insulating layer using the second photoresist pattern as an etch mask to form the semiconductor layer and to form a gate pad contact hole in the gate insulating layer, the gate pad contact hole exposing the gate pad.

4. The method according to claim 3, wherein forming a first photoresist pattern comprises:
    forming a photoresist layer on the doped silicon layer;
    disposing a mask having a transmissive area, a half-transmissive area and a blocking area over the first photoresist layer, the half-transmissive area having a transmittance greater than the blocking area and smaller than the transmissive area, the transmissive area corresponding to the gate pad and the data pad, the blocking area corresponding to the gate electrode;

exposing the photoresist layer through the mask; and
developing the photoresist layer to form the first photoresist pattern.

5. The method according to claim 1, wherein the passivation pattern is formed through a sputtering method.

6. A method of fabricating an array substrate for a liquid crystal display device, comprising:
forming a gate line, a gate electrode connected to the gate line, a gate pad at one end of the gate line on a substrate through a first mask process;
forming a gate insulating layer on the gate line, the gate electrode, and the gate pad;
forming a semiconductor layer on the gate insulating layer through a second mask process, the boundary of the semiconductor layer is within the gate electrode; and
forming a data line crossing the gate line, a source electrode connected to the data line, a drain electrode spaced apart from the source electrode, a pixel electrode extending from the drain electrode, a gate pad terminal contacting the gate pad and a data pad terminal connected to the data line and forming a passivation pattern on the data line, the source electrode and the drain electrode through a third mask process,
wherein the third mask process comprises:
sequentially forming first and second conductive material layers on the semiconductor layer;
forming a first photoresist pattern on the second conductive material layer, the first photoresist pattern having a first portion and a second portion having a thickness greater than the thickness of the first portion, the second conductive material layer corresponding to the gate electrode exposed through the first photoresist pattern;
patterning the second conductive material layer and the first conductive material layer using the first photoresist pattern as an etch mask to form the data line, the source electrode, the drain electrode and a pixel electrode pattern;
partially removing the first photoresist pattern to form a second photoresist pattern corresponding to the pixel electrode pattern;
forming a passivation layer on the second photoresist pattern, the data line, the source electrode and the drain electrode;
removing the second photoresist pattern and the passivation layer on the second photoresist pattern to form the passivation pattern; and
removing the second conductive material layer of the pixel electrode pattern to form the pixel electrode.

7. The method according to claim 6, wherein forming a first photoresist pattern comprises:
forming a photoresist layer on the second conductive material layer;
disposing a mask having a transmissive area, a half-transmissive area and a blocking area over the photoresist layer, the half-transmissive area having a transmittance greater than the blocking area and smaller than the transmissive area, the transmissive area corresponding to a central portion of the semiconductor layer, the half-transmissive area corresponding to the data line, the source electrode and the drain electrode, the blocking area corresponding to the pixel electrode;
exposing the photoresist layer through the mask; and
developing the photoresist layer to form the first photoresist pattern.

8. A method of fabricating an array substrate for a liquid crystal display device, comprising:
forming a gate line, a gate electrode connected to the gate line, a gate pad at one end of the gate line on a substrate through a first mask process;
forming a gate insulating layer on the gate line, the gate electrode, and the gate pad;
forming a semiconductor layer on the gate insulating layer through a second mask process, the boundary of the semiconductor layer is within the gate electrode; and
forming a data line crossing the gate line, a source electrode connected to the data line, a drain electrode spaced apart from the source electrode, a pixel electrode extending from the drain electrode, a gate pad terminal contacting the gate pad and a data pad terminal connected to the data line and forming a passivation pattern on the data line, the source electrode and the drain electrode through a third mask process,
forming a common line on the substrate through the first mask process; and
forming a common electrode connected to the common line through the third mask process, the common electrode alternating with the pixel electrode in the pixel region.

9. The method according to claim 8, wherein the second mask process further comprises forming a common contact hole exposing the common line in the gate insulating layer.

* * * * *